United States Patent [19]
Wigner et al.

[11] 3,851,251

[45] Nov. 26, 1974

[54] RECEIVER METHOD AND APPARATUS

[75] Inventors: William K. Wigner, Kissimmee; Albert S. Sabin, Jr., Orlando, both of Fla.

[73] Assignee: Martin Marietta Corporation, New York, N.Y.

[22] Filed: Oct. 25, 1971

[21] Appl. No.: 191,726

[52] U.S. Cl. ................ 325/55, 179/15 BA, 325/58, 340/146.1 AX, 340/146.1 C, 340/311

[51] Int. Cl. .......................... H04b 5/04, H04b 1/10

[58] Field of Search ............ 325/30, 51, 54, 55, 58, 325/64, 419, 31, 41, 42, 53, 65, 67, 302; 179/15 BA, 15 BS, 15 AL, 18 BF, 41 R,41 A; 340/167 R, 146.1 AX, 146.1 C, 311, 312; 178/69

[56] References Cited

UNITED STATES PATENTS

| | | | |
|---|---|---|---|
| 3,085,200 | 4/1963 | Goodall | 179/15 BS |
| 3,384,873 | 5/1968 | Sharma | 340/146.1 C |
| 3,475,558 | 10/1969 | Cahn | 179/15 BA |
| 3,542,968 | 11/1970 | Mercer | 179/41 R |

*Primary Examiner*—Benedict V. Safourek
*Assistant Examiner*—Marc E. Bookbinder
*Attorney, Agent, or Firm*—Burns, Doane, Swecker & Mathis

[57] ABSTRACT

A novel receiver and method of receiver synchronization in which the period of receiver operation is a function of received signal characteristics and including a novel method of evaluating the received signal.

40 Claims, 14 Drawing Figures

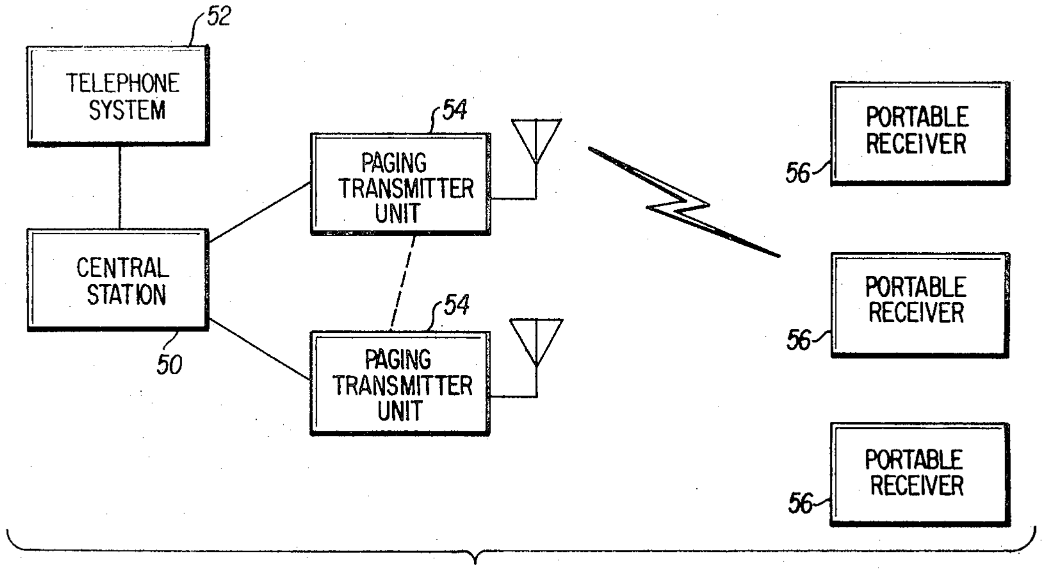
FIG. 1 SYSTEM
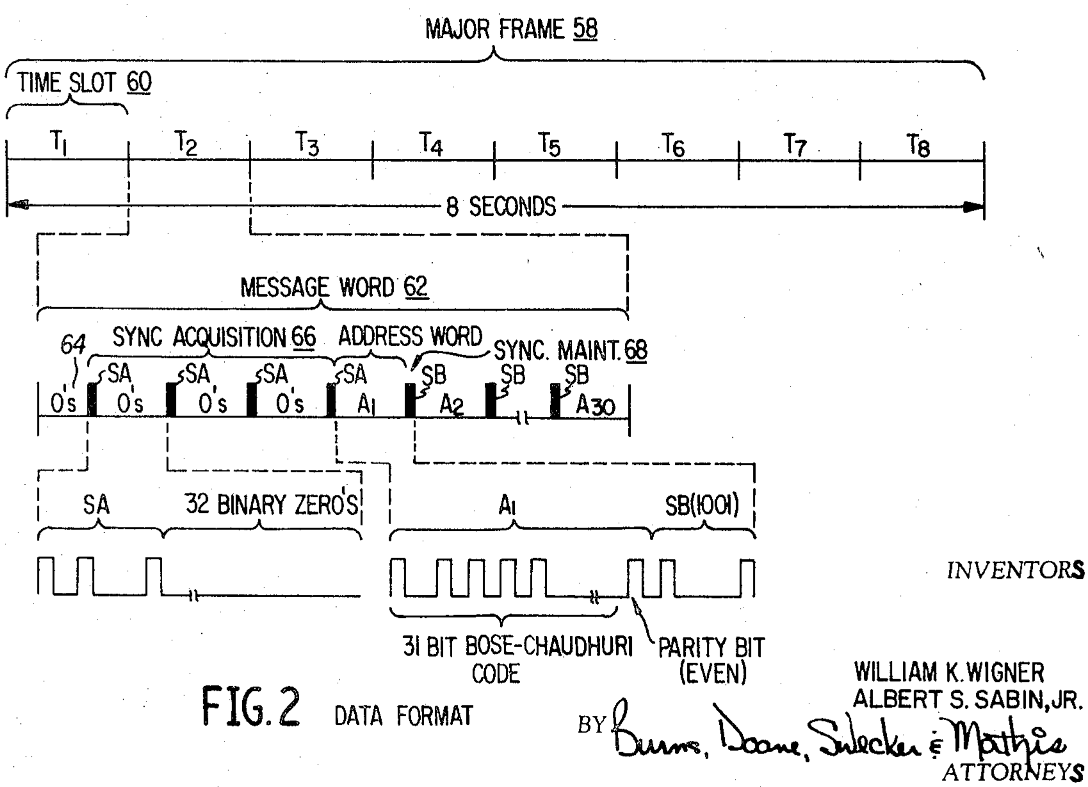
FIG. 2 DATA FORMAT
INVENTORS
WILLIAM K. WIGNER
ALBERT S. SABIN, JR.
BY Burns, Doane, Swecker & Mathis
ATTORNEYS PATENTED NOV 26 1974 3,851,251
SHEET 02 OF 10
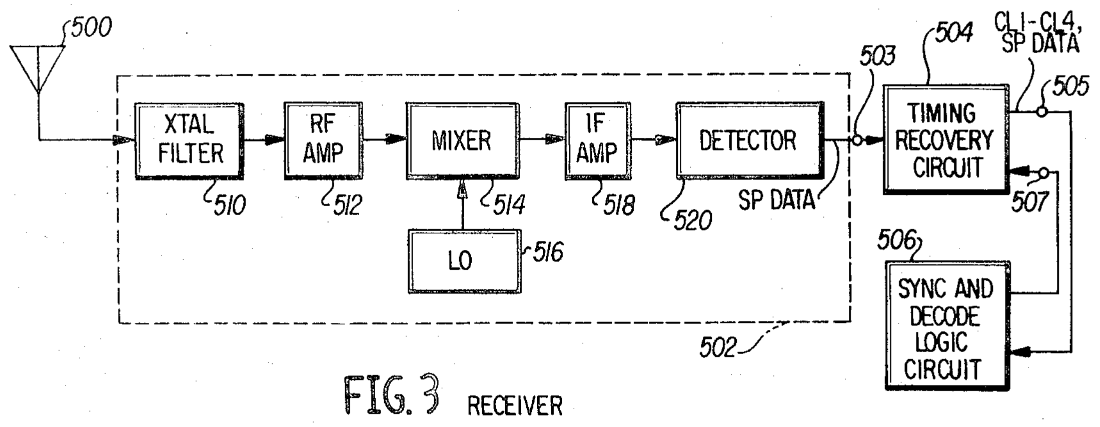
FIG. 3 RECEIVER
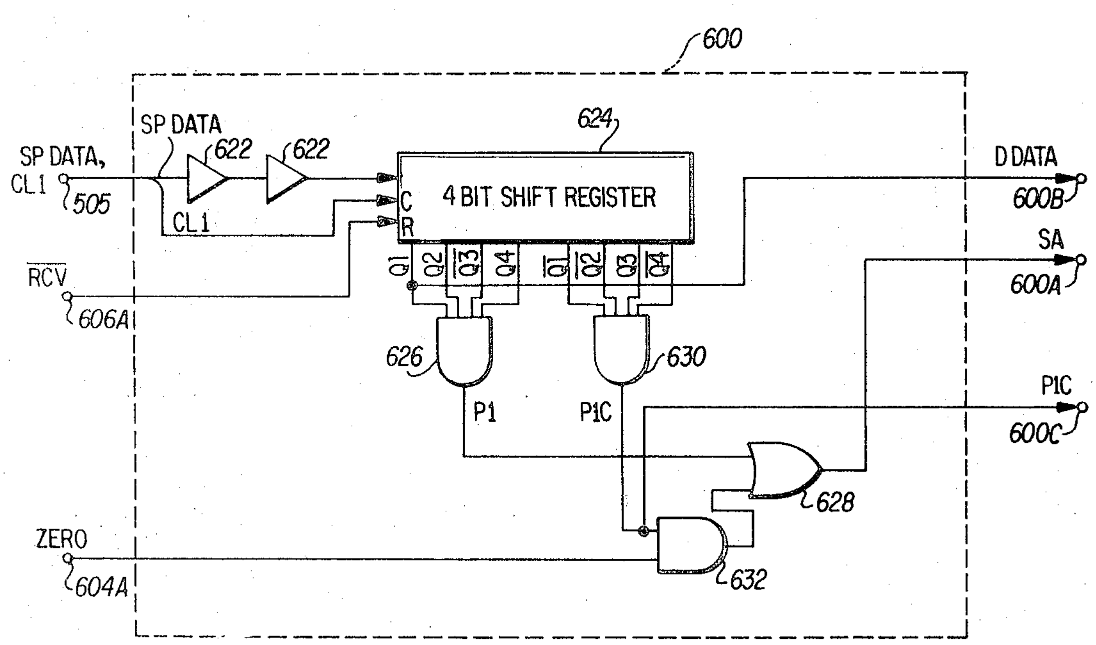
FIG. 6 SYNC PATTERN DETECTOR

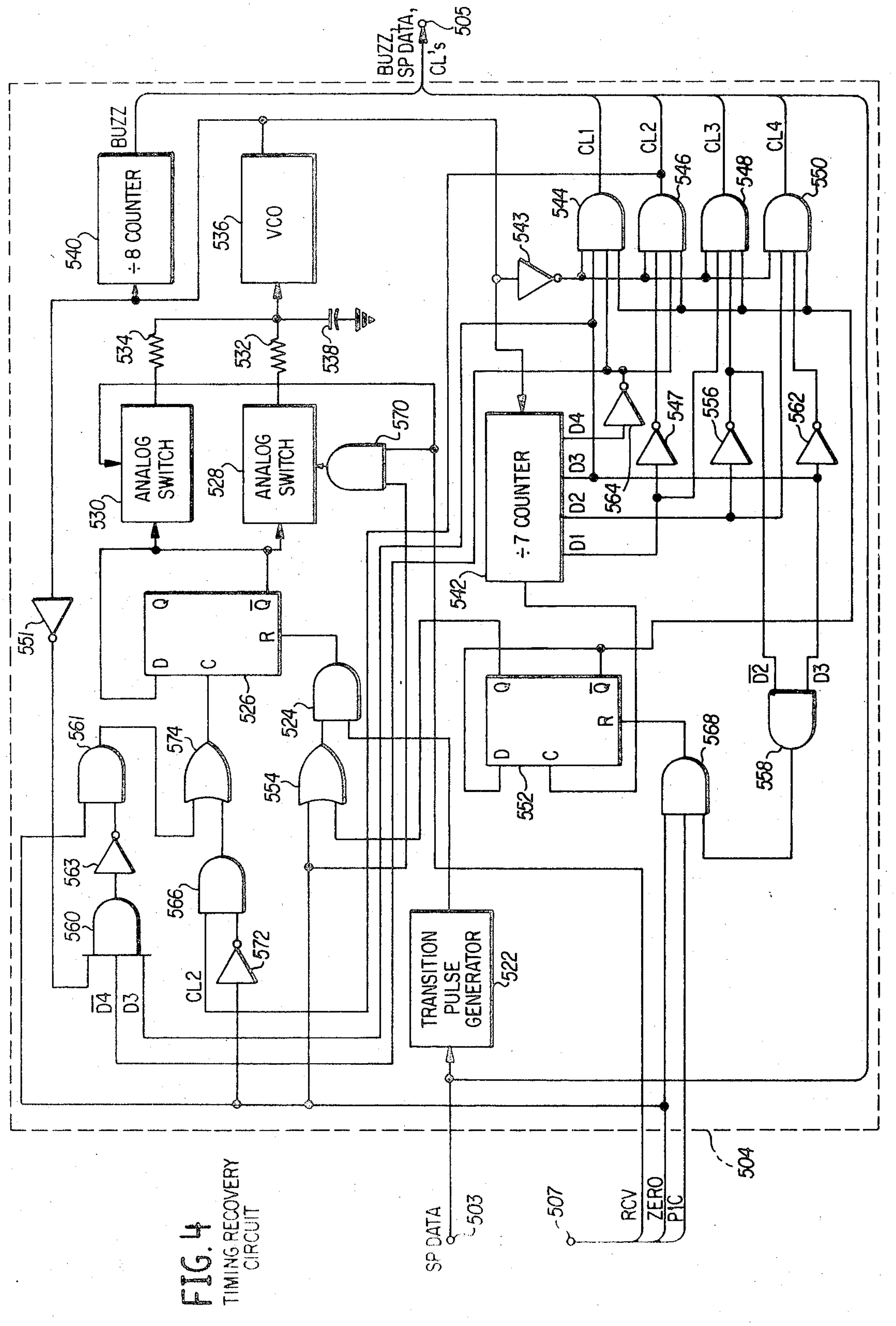
FIG. 4 TIMING RECOVERY CIRCUIT

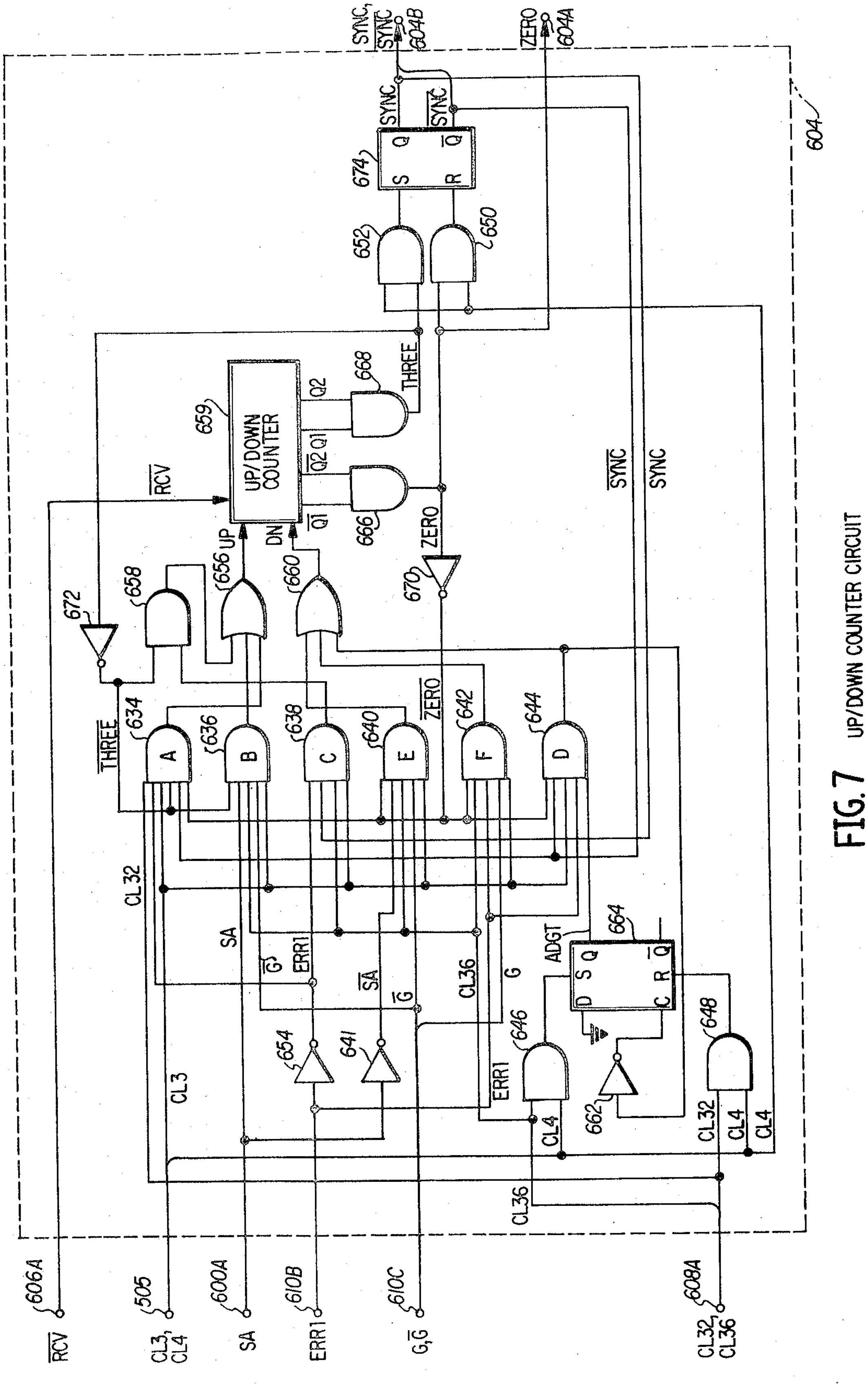
FIG. 7 UP/DOWN COUNTER CIRCUIT

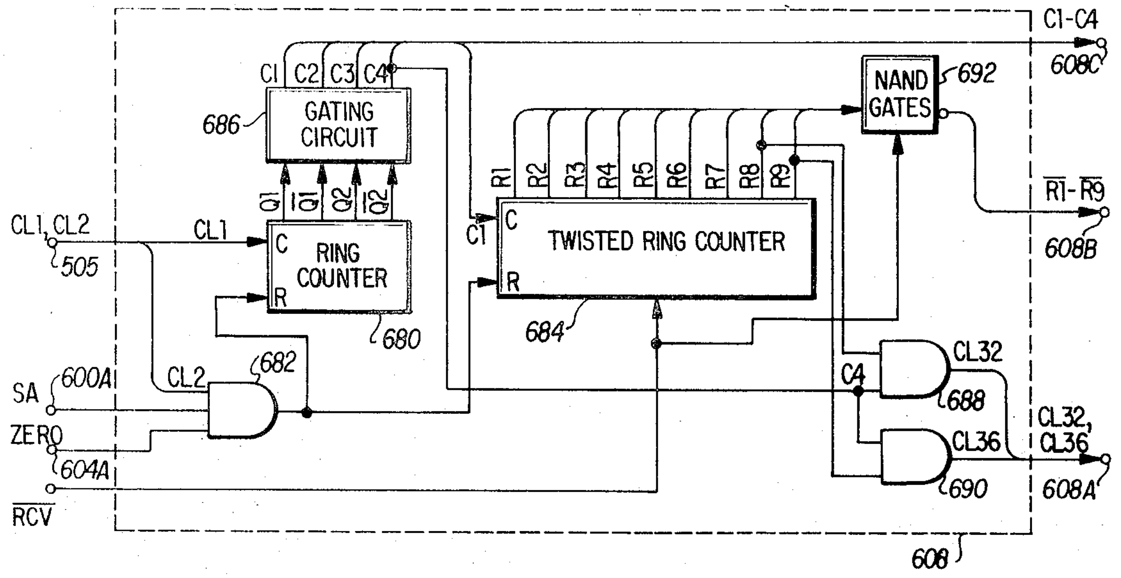
FIG. 8 MATRIX ADDRESS GENERATOR
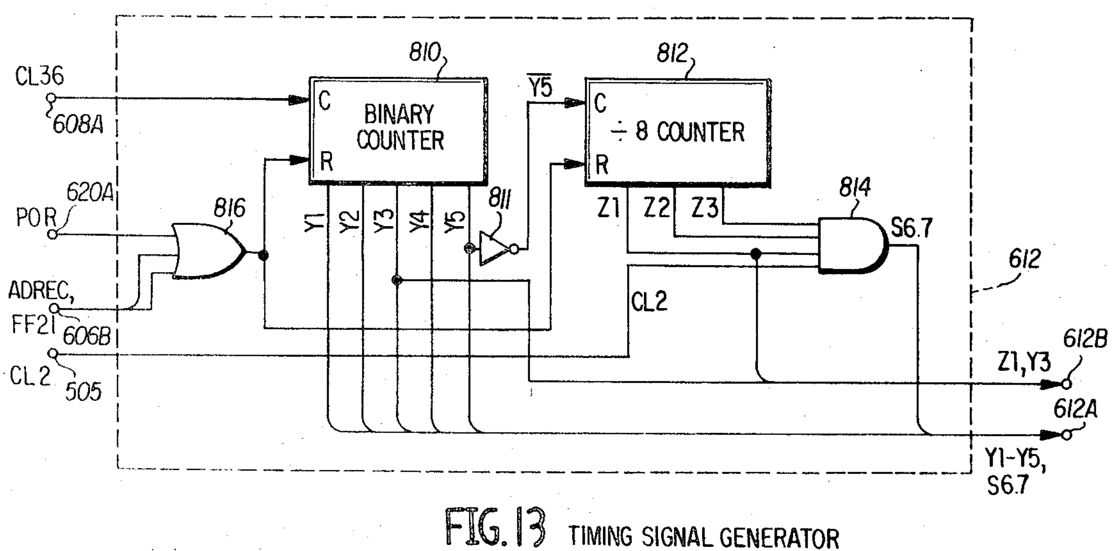
FIG. 13 TIMING SIGNAL GENERATOR

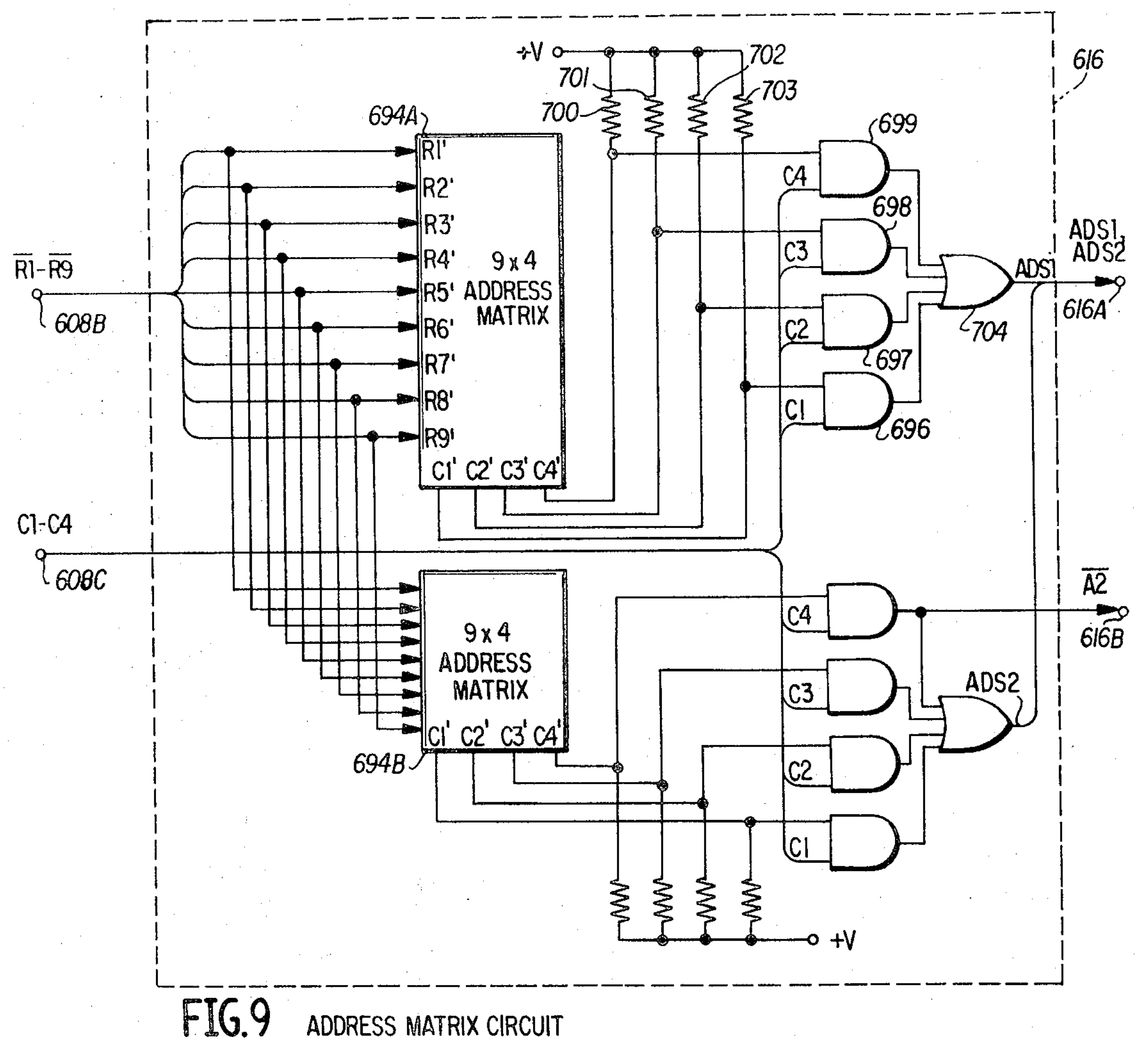
FIG.9 ADDRESS MATRIX CIRCUIT

RECEIVER METHOD AND APPARATUS

BACKGROUND OF THE INVENTION

The present invention relates to a method and apparatus for data transmission and control. While the applications for the method and apparatus of the present invention are legion both for data transmission and for control, particular utility has been found in the environment of a subscriber paging service and the invention will hereinafter be described in that environment for illustrative purposes.

For example, known paging systems generally involve the selective transmission of subscriber identifying signals via electromagnetic wave energy at line-of-sight frequencies from a plurality of transmitters spaced throughout the paging area. Each of the subscribers is conveniently provided with a portable receiver which provides an audible indication upon the reception and decoding of the assigned subscriber identifying signal.

An interference problem is inherent in such known systems because the line-of-sight propagation characteristic of the electromagnetic radiation necessitates the employment of a plurality of transmitters spaced throughout the paging area to insure the complete coverage thereof, and because all of the portable receivers must be tuned to the same carrier frequency to insure reception throughout the paging area. These known paging systems have thus been faced with the undesirable alternatives of leaving areas between adjacent transmitters wherein a subscriber cannot be paged (blind spots) and of interference due to the overlapping of the propagation patterns of adjacent transmitters.

In known multiple transmitter systems of the type described, an analog squelch is generally required. The utilization of an analog squelch is generally required. The utilization of an analog squelch is, however, difficult due to varying ambient noise conditions. Moreover, the utilization of an analog squelch requires considerable additional power at each of the receivers and the redundant monitoring of data where, for example, all transmitters are visible from a receiver.

In the furtherance of these objects, the present invention utilizes digital techniques by which the physical size and weight of the portable receivers may be reduced and the longevity of the receiver power supplies increased.

It is thus another object of the present invention to provide a novel method and apparatus for reducing power consumption and the physical size and weight of receiver power supplies.

The above objects are primarily accomplished in the present invention through transmitter sequencing and receiver synchronization. Since the receivers are not operative in the absence of data transmission, the probability of decoding noise is largely eliminated. Moreover, the selection by the receiver of the transmitter as a function of the characteristics of the received signal materially reduces the probability of decoding noisy data from either a weak transmitter or a nearby transmitter which is providing noisy or otherwise undesirable signals.

It is thus another object of the present invention to reduce decoding errors and to provide a novel method and apparatus for receiving data signals only during time intervals selected as a function of the reception characteristics of the received signal.

Digital techniques for the transmission of data signals are particularly advantageous in that an extremely large amount of data may be transmitted from one location to another in short time intervals and with a minimum of complex equipment such as highly accurate frequency generators and mixers as well as highly accurate frequency decoders. For example, a digital word comprising ten binary bits can provide over 1000 different messages.

Of course, where digital techniques are used, the loss of binary bits in a particular signal may result in an erroneous evaluation of the signal. For example, in prior art digital data transmission systems where a plural bit address or data signal is transmitted and decoded by bit counting or bit comparison techniques as with an AND gate, the loss of a single pulse due to interference or other transmission problems results in erroneous data at the receiving end of the system. where a plural bit address or data signal is transmitted and decoded by bit counting or bit comparison techniques as with an AND gate, the loss of a single pulse due to interference or other transmission problems results in erroneous data at the receiving end of the system.

Yet still a further object of the present invention is to provide a novel method and apparatus for the bit-by-bit evaluation of a data signal at a remote receiver.

Since the method and apparatus of the present invention has particular utility and will be hereinafter described in a subscriber paging system embodiment, it is an object of the present system to obviate the deficiencies of known paging systems and to provide a novel paging method and apparatus.

It is still another object of the present invention to provide a novel method and paging system employing bit-by-bit evaluation of received subscriber addresses at the portable receiver.

A further object of the present invention is to provide a novel method and paging system in which receiver power is conserved through the selection of one of a plurality of time slots within a predetermined paging data frame for subscriber address evaluation.

Yet still a further object of the present invention is to provide a novel method and apparatus for evaluating paging signal errors.

Yet a further object of the present invention is to provide a novel method and apparatus for deriving timing signals at each of a plurality of receivers from the received paging signal.

These and many other objects and advantages of the present invention will be readily apparent to one skilled in the art to which the invention pertains from the claims and from a perusal of the following detailed description of an exemplary embodiment when read in conjunction with the appended drawings.

THE DRAWINGS

FIG. 1 is a general functional block diagram of a basic embodiment of an exemplary paging system;

FIG. 2 is a timing diagram illustrating the data format;

FIG. 3 is a functional block diagram of one of the portable receivers of FIG. 1;

FIG. 4 is a functional block diagram of the timing recovery circuit of FIG. 3;

FIG. 6 is a more detailed functional block diagram of the sync pattern detector of FIG. 5;

FIG. 7 is a more detailed functional block diagram of the up/down counter circuit of FIG. 5;

FIG. 8 is a more detailed functional block diagram of the matrix address generator of FIG. 5;

FIG. 9 is a more detailed functional block diagram of the address matrix circuit of FIG. 5;

FIG. 13 is a more detailed functional block diagram of the timing signal generator of FIG. 5; and, FIG. 14 is a more detailed functional block diagram of the receiver on/off logic circuit of FIG. 5.

DETAILED DESCRIPTION

A preferred embodiment and several modifications of the method and receiver of the present invention in the environment of a paging system are set out infra in accordance with the following Table of Contents:

TABLE OF CONTENTS

Figure 14:
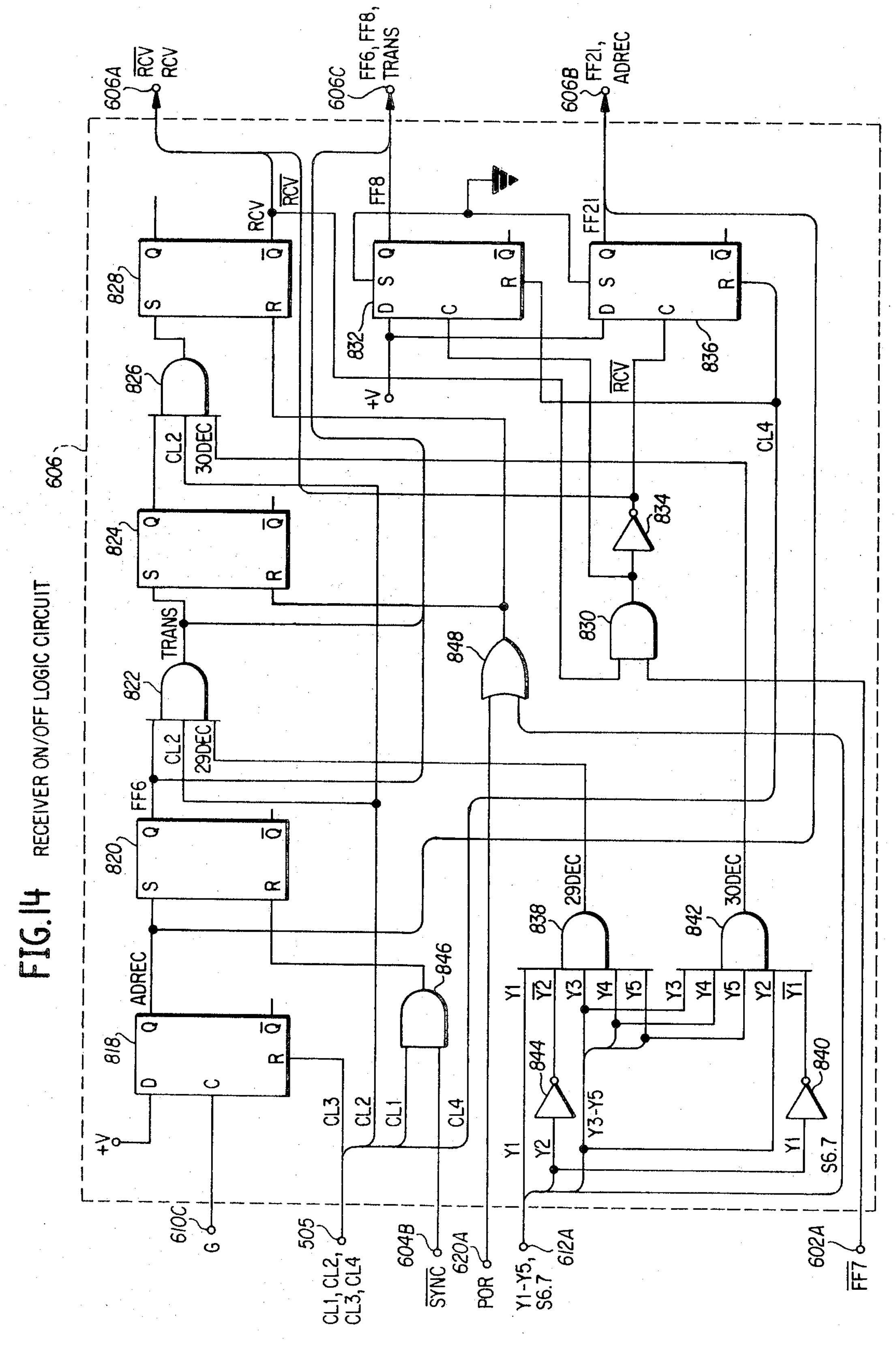

I. Basic System Description (FIG. 1)
II. Data Format (FIG. 2)
III. Receiver (FIGS. 3–14)
A. Timing Recovery Circuit (FIG. 4)
B. Sync and Decode Logic Circuit (FIG. 5)
1. Sync Pattern Detector (FIG. 6)
2. Up/Down Counter Circuit (FIG. 7)
3. Matrix Address Generator (FIG. 8)
4. Address Matrix Circuit (FIG. 9)
5. Address Evaluator (FIG. 10)
6. Address Accept Circuit (FIG. 11)
7. Page Indicator (FIG. 12)
8. Timing Signal Generator (FIG. 13)
9. Receiver On/Off Logic Circuit (FIG. 14)

I. BASIC SYSTEM DESCRIPTION

With reference to FIG. 1 where a basic paging system embodiment of the present invention is illustrated, the central station 50 may, where the capacity of the system so dictates, include a suitable general purpose digital computer (not shown) The central station 50 may be accessed through any suitable switching system such as the illustrated commercially installed telephone system 52 to receive subscriber designating signals via the commercially installed telephone lines and exchanges of the system 52. In response to the received subscriber designating signals, the central station 50 may generate paging signals for transmission to one or more of a plurality of transmitter units 54 spaced throughout the paging area.

The paging signals transmitted from at least one of the transmitter units 54 are received by portable receivers 56 carried by the individual system subscribers. The receipt of the address signal assigned to a particular subscriber by his portable receiver 56 will provide the subscriber with an indication that a call has been received. The subscriber may thereafter determine the reason for the page by seeking a telephone and dialing a designated number to receive a message or by directly dialing the person who initiated the page if that information is known to the subscriber.

A more detailed discussion of the system of FIG. 1 and its operation may be obtained from the Wells, et al, patent application Ser. No. 191,855 entitled "Data Transmission Method and Apparatus" filed concurrently herewith and assigned to the assignee of the present invention. The disclosure of said Sabin, Jr., et al, patent application Ser. No. 191,855 is hereby incorporated herein by reference.

II. DATA FORMAT

The data format utilized with the preferred embodiment of the paging system is illustrated in FIG. 2. As was previously described in connection with FIG. 1, the dialing party initiates subscriber designation signals for transmission to the central station 50 through the telephone system 52. These subscriber designation signals are converted to binary form and stored in a waiting queue at the central station 50 for subsequent encoding and combination with synchronizing signals to form a paging signal which may, for example, comprise a 30 subscriber address message word for repetitive transmission in a predetermined number of time slots during one major data frame. Repetition of the same message word is, of course, not required in a single transmitter system but can be effected if desired.

In the example shown in FIG. 2, each major frame 58 may comprise eight one second time slots 60 designated $T_1$ through $T_8$. The identical message word 62 may be transmitted during each of the eight time slots of a particular major frame from a different transmitter or group of transmitters as will hereinafter be described in greater detail. Thus, the number of transmitter units 54 of FIG. 1 may be at least equal to the number of time slots utilized in a major frame and a particular transmitter of one of the transmitter units 54 may transmit a message word 62 during one or several of the time slots 60 in a major frame 58. The number of time slots 60 may, of course, exceed the number of transmitters in the system where expansion of the paging area is contemplated.

With continued reference to FIG. 2, each message word 62 is a serial pulse train preferably commencing with a group of 12 binary bits. e.g., 12 binary ZERO bits as indicated at 64, followed by a synchronization (sync) acquisition signal 66, and in turn, followed by 30 different addresses or address words A1–A30 which may be separated from each other by identical sync maintenance signals 68 of 4 binary bits each. The sync acquisition signal 66 preferably includes four identical 4 bit patterns each separated by a 32 binary bit signal, e.g., 32 binary ZEROS in the signal illustrated in FIG. 2. The four identical 4 bit sync patterns (designated SA) are coded in accordance with a predetermined binary code, e.g., 1101 as illustrated. Thus, the sync acquisition signal may be indicated as SA, O's, SA, O's, SA, O's, SA where SA designates the selected 4 bit code and O's designates the 32 binary ZERO's.

Each address word A1–A30 preferably includes a 31 bit Bose-Chaudhuri coded address designation and one parity bit. Adjacent of the 30 address words A1–A30 are separated by the sync maintenance signal 68 (designated SB) which is preferably a four bit serially coded signal which differs from the sync acquisition code SA. Thus, each message word 62 transmitted during one of the time slots $T_1$–$T_8$ comprises 1,200 binary bits.

The initial 12 binary ZERO bits indicated at 64 in FIG. 2 are not required but may be utilized to assist in bit synchronization of the receivers as will hereinafter be described. In addition, these 12 binary ZERO bits provide some time spacing between the turn on of a transmitter and the transmission of the sync admission signal 66 which time spacing may be desirable. The initial 12 binary bits need not, of course, be all binary ZERO's but may be any predetermined code. Simplification of the logic is, however, possible by the use of all ZERO's in the described embodiment and the use thereof may be desirable where, for example, the communications link between the central station 50 and transmitter units 54 of FIG. 1 is omnidirectional transmission of electromagnetic energy at radio frequencies.

When transmitted by the transmitter units 54 of FIG. 1, the synchronization acquisition signals illustrated in FIG. 2 may be utilized by the individual paging receivers 56 to determine the bit error rate of the paging signal prior to decoding the subsequent address words as will subsequently be described in greater detail. The four bit sync maintenance signal SB may be unique to the paging system operating in a particular paging area and may be utilized both to assist in determining the bit error rate and to ensure proper framing of each of the address signals. Moreover, if signals are received by a portable receiver assigned to one paging area from a paging system in an adjacent paging area, the sync maintenance signal SB assigned to the system of the adjacent area will be rejected by the receiver. The likelihood of false synchronization and possible erroneous paging of receivers by signals from the wrong system is thus significantly reduced.

As previously discussed, each of the address words A1–A30 comprises 32 bit positions. The first 31 bit positions may identify the subscriber being paged and the last bit may be inserted as a parity bit. All 32 bits may, however, be used as the subscriber address. The preferred code is a highly redundant Bose-Chaudhuri 31-16-3 code, i.e., 31 total bits are utilized to code a 16 bit message with a 7 bit (2 time 3 + 1) difference between each message. The use of this code with an even parity bit increases the bit difference between codes to a minimum of 8 bits between adjacent unique addresses while allowing the system to service over 65,500 subscribers.

In addition to the extremely high subscriber address capacity provided by the Bose-Chaudhuri 31-16-code, the use of this code makes the probability of accepting the correct address very high, while at the same time severely limiting the probability of accepting an address intended for another subscriber, even in very high error environments. For example, if two bit errors are tolerated in decoding an address for a particular subscriber, the probability of a receiver accepting that address is over 99.99 percent. Moreover, since only two bit errors are tolerated in this example in decoding an address, there are still at least six bit differences between the subscriber's address and any other transmitted address.

If the extremely high subscriber capacity achieved with the abovedescribed code is not required, a Bose-Chaudhuri 31-11-5 code may be utilized. The use of this code limits the number of allowable users to 2,047 but increases the number of differences between any two coded address signals to at least 12 bits, significantly reducing still further the probability of false calls. On the other hand, if still higher capacity is required, a Bose-Chaudhuri 31-21-2 code may be utilized. This code provides subscriber capacity of over 2 million with the difference between any two addresses being reduced to a minimum of 6 bits. This lower minimum bit difference of 6 tends to slightly increase the probability of a false call, but the increase is very slight when compared to the vast increase in system capacity.

Irrespective of which of the above codes is utilized, the system data format as illustrated in FIG. 2 may remain the same. Moreover, the central station does not require 31 bit capacity for storing incoming addresses and directory addresses since the highly redundant Bose-Chaudhuri encoded addresses may be readily generated from address signals having fewer than 31 bits, e.g., from a 16 bit address signal when utilizing the preferred Bose-Chaudhuri 31-16-3 code.

III. RECEIVER

One novel embodiment of the portable receivers 54 illustrated in the system of FIG. 1 is illustrated in FIG. 3. Referring now to FIG. 3, the novel portable receiver 54 of the present invention generally comprises an antenna 500, an FM radio receiver 502, a timing recovery circuit 504 and a sync and decode logic circuit 506.

The antenna 500 may be any suitable conventional antenna which preferably takes up little space in the receiver housing. For example, the antenna 500 may comprise a conventional ferrite antenna suitable for operation at the desired radio wavelengths.

The FM radio receiver 502 may likewise be any suitable conventional preferably miniaturized FM radio receiver for receiving the radio frequency paging signal detected by the antenna 500 and for detecting the modulation of the radio frequency signal carrier.

The radio paging signal detected by the antenna 500 may be applied to a suitable conventional crystal bandpass filter 510 tuned to the center frequency at which the radio paging signals are transmitted. The output signal from the crystal filter 510 may be amplified by a suitable conventional radio frequency amplifier 512 and applied to a suitable conventional mixer 514. The output signal from a conventional local oscillator 516 may be applied to the mixer 514 and the intermediate frequency (IF) output signal from the mixer 514 may be amplified through a conventional IF amplifier 518 and applied to a suitable conventional FM detector or discriminator 520.

A SPDATA output signal from the detector 520 may then be applied to the timing and data recovery circuit 504 via an input terminal 503 and the output signals from the timing and data recovery circuit 504 may be applied to the sync and decode logic circuit 506 via a collective output terminal 505. A plurality of signals from the sync and decode logic circuit 506 may be applied to the timing and data recovery circuit 504 via a collective terminal 507 as will be subsequently explained.

The FM radio receiver 502 operates in a conventional manner to detect changes in the frequency of the detector radio signals within the desired frequency band with respect to a predetermined center frequency. Since, in the preferred embodiment of the present invention, the paging signals are transmitted as frequency shift keyed signals, the output signal from the detector 520 of the FM radio receiver 502 comprises a plurality of pulses which change in signal level each time a shift in the frequency of the input signal applied to the detector 520 is sensed. These output pulses are preferably in the form of conventional split phase signals and comprise the SPDATA signal applied to the output terminal 503.

The timing and data recovery circuit 504 converts the SPDATA signal from the detector 502 into a conventional non-return to zero (NRZ) digital format and recovers timing signals therefrom. This NRZDATA signal and the generated timing signals are then applied to the sync and decode logic circuit 506 for evaluation as will hereinafter be described in greater detail in connection with FIG. 5.

A. Timing Recovery Circuit

The timing recovery circuit 504 of FIG. 3 is illustrated in greater detail in the functional block diagram of FIG. 4. Referring to FIG. 4, the split phase data signal SPDATA from the output terminal 503 of the detector 520 of FIG. 3 may be applied to a suitable conventional transition pulse generator 522 in the timing and data recovery circuit 504. The output signal from the transition pulse generator 522 may be applied to one input terminal of a two input terminal AND gate 524 and the output signal from the AND gate 524 may be applied to the reset input terminal R of a conventional bistable multivibrator or flip-flop 526.

The false or $\overline{Q}$ output terminal of the flip-flop 526 may be connected to the set steering input terminal D of the flip-flop 526 and to the analog data input terminals of first and second analog switches 528 and 530. The output signals from the analog switches 528 and 530 may be applied, respectively, through resistors 532 and 534 to the control input terminal of a conventional voltage controlled oscillator (VCO) 536. The control input terminal of the oscillator 536 may be grounded through a capacitor 538.

The output signal from the VCO 536 may be applied to a divide by eight counter 540, to a divide by seven counter 542, through an inverter 543 to one input terminal of each of a plurality of four input terminal AND gates 544–550, and through an inverter 551 to one input terminal of a three input terminal AND gate 560.

The output signal from the counter 542 may be applied to the clock input terminal C of a conventional bistable multivibrator or flip-flop 552 and the false output terminal $\overline{Q}$ of the flip-flop 552 connected to the set steering input terminal D thereof. The output signal from the false output terminal $\overline{Q}$ of the flip-flop 552 may be applied to one input terminal of each of the AND gates 544-550 and the output signal from the true output terminal Q of the flip-flop 552 may be applied to one input terminal of a two input terminal OR gate 554. The output signal from the OR gate 554 may be applied to the other input terminal of the AND gate 524.

The D1 output signal from the first stage of the counter 541 may be applied to one input terminal of the AND gate 548 and through an inverter 547 to one input terminal of the AND gate 546. The D2 signal from the second stage of the counter 542 may be applied to one input terminal of the AND gate 550, through an inverter 556 to one input terminal of the AND gate 548, and to one input terminal of a two input terminal AND gate 558.

The D3 output signal from the counter 542 may be applied to the other input terminal of the AND gate 558, to one input terminal of the AND gate 544, to one input terminal of the three input terminal AND gate 560 and through an inverter 562 to one input terminal of the AND gate 550. The D4 output signal from the counter 542 may be applied through an inverter 564 to one input terminal of each of the AND gates 544, 546, and 560.

The CL1–CL4 clock output signals from the AND gates 544–550, respectively, may be applied to the collective output terminal 505 together with the SPDATA signal from the detector 520 of FIG. 3 and the output signal BUZZ from the divide by eight counter 540. In addition, the CL2 clock signal from the AND gate 546 may be applied to one input terminal of a two input terminal AND gate 566.

With continued reference to FIG. 4, the ZERO signal from the collective terminal 507 of the sync and decode logic circuit 506 of FIG. 3 may be applied to one input terminal of a three input terminal AND gate 568, to the other input terminal of the OR gate 554, to one input terminal of a two input terminal AND gate 570, to one input terminal of a two input terminal AND gate 561, and through an inverter 572 to the other input terminal of the AND gate 566. The output signal from the AND gate 560 may be applied through an inverter 563 to the other input terminal of the AND gate 561 and the output signal from the AND gate 561 may be applied to one input terminal of a two input terminal OR gate 574. The output signal from the AND gate 566 may be applied to the other input terminal of the OR gate 574 and the output signal from the OR gate 574 may be applied to the clock input terminal C of the flip-flop 526.

A RCV signal is applied to the collective input terminal 507 of the timing recovery circuit 504 of FIG. 4 from the sync and decode logic circuit 506 of FIG. 3 may be applied to the other input terminal of the AND gate 570 and to the gate input terminal of the analog switch 530. The output signal from the AND gate 570 may be applied to the gate input terminal of the analog switch 528.

A P1C signal is also applied to the collective input terminal 507 from the sync and decode logic circuit 506 of FIG. 3 and may be applied to an input terminal of the AND gate 568. The output signal from the AND gate 558 may be applied to another input terminal of the AND gate 568. The output signal from the AND gate 568 may be applied to the reset input terminal R of the flip-flop 552.

In operation, the split phase data signal SPDATA detected by the detector 520 of the radio receiver 502 of FIG. 3 may be applied to the transition pulse generator 522 of FIG. 4 to generate an output pulse each time the SPDATA signal changes signal level.

The pulses from the transition pulse generator 522 thus have a repetition rate approximately twice the bit rate of the data applied thereto and, since the bit rate of the split phase data is about 1,200 bits per second, the repetition rate of the signal from the transition pulse generator 522 is approximately 2,400 bits per second. It should be noted, however, that while the frequency of the signal from the transition pulse generator 522 will be approximately 2,400 pulses per second, some pulses will be missing since the SPDATA signal is in the form of non-return to zero data.

The output signal from the voltage controlled oscillator 536 must be synchronized in phase with the incoming split phase data signal to insure the generation of clock signals CL1–CL4 synchronized in phase and bit rate with the incoming SPDATA signal. To insure proper synchronization of the voltage controlled oscillator 536, a phase-lock loop may be utilized to generate a signal related to the phase difference between the incoming SPDATA signal and the clock signals for controlling the VCO 536 as is hereinafter described in greater detail.

The output signal from the transition pulse generator 522 is gated through the AND gate 524 and applied to the reset input terminal R of the flip-flop 526 to reset the flip-flop each time the SPDATA signal changes signal level. Since it is desirable to rapidly lock the voltage controlled oscillator 536 in phase with the incoming data signal during the 12 dummy bits at the beginning of each message word, all of the transition pulses are initially gated through the AND gate 524 by the high signal level ZERO signal from the word synchronizer of the sync and decode logic circuit 506 subsequently described in greater detail in connection with FIG. 5. In addition, during this initial 12 bit period and until the ZERO signal from the sync and decode logic circuit 506 assumes a low signal level, both of the analog switches 528 and 530 of FIG. 4 are enabled.

With continued reference to FIG. 4, the phase detect flip-flop 526 is clocked during this initial rapid synchronization period by the output signal from the voltage controlled oscillator 536 and is reset by the transition pulses from the pusle generator 522. The output signal from the false or $\overline{Q}$ output terminal of the flip-flop 526 is applied through the enabled analog switches 528 and 530 to the integrator comprising the resistors 532 and 534 and the capacitor 538. The voltage developed across the capacitor 538 controls the output signal from the VCO 536, synchronizing this output signal in phase with the SPDATA signal at a frequency of about 16.8 kilohertz.

Since the phase information supplied to the phase detect flip-flop 526 is at a 2.4 kilohertz rate during the period when the ZERO signal is at a high signal level and since the RC time constant of the integrator circuit is quite small resulting in an increased phase lock loop bandwidth, the voltage controlled oscillator rapidly synchronizes to the incoming SPDATA signal. However, there is still a possible phase ambiguity of plus or minus 180° which must be resolved since the output signal from the transition pulse generator 522 does not differentiate between positive going and negative going transitions.

To determine the proper phasing of the clock signals, the output signal from the VCO 536 is applied to the divide by seven counter 542 and the 2.4 kilohertz output signal therefrom may be utilized to clock the phase select flip-flop 552. When the flip-flop 552 is clocked at the 2.4 kilohertz rate, the output signal from the true output terminal Q thereof controls the gating of the transition pulses through the AND gate 524 and may be either in phase or out of phase with the incoming split phase data. As long as the sync acquisition pattern SA of the incoming message word of the SPDATA signal is successfully recognized, the phase of the output signal from the phase select flip-flop 552 is not changed. However, should the complement (i.e., 0010 of the illustrative sync acquisition pattern 1101 of FIG. 3) be recognized, the "sync pattern complement" or P1C signal assumes a high signal level and the flip-flop 552 is reset at the proper time by the $\overline{D2}$ and D3 signals from the divide by seven counter 542. The phase of the output signal from the flip-flop 552 is thus reversed.

Upon recognition of the sync acquisition pattern SA or its complement by the sync and decode logic circuit 506 as is hereinafter described in connection with FIG., 5, the ZERO signal assumes a low signal level inhibiting the AND gates 561, 568 and 570 and enabling the AND gate 566. Thereafter, the $CL_2$ signal clocks the flip-flop 526. The flip-flop 526 is thus reset on every other transition pulse selected by the phase select flip-flop 552. In addition, the analog switch 528 is inhibited and the RC time constant of the integrator circuit is substantially increased, thereby decreasing the bandwidth of the phase-lock loop.

The divide by seven counter 542 provides four output signals D1–D4 from the true output terminals of the first through fourth stages thereof, respectively. These signals are decoded by the AND gates 544-550 to provide the four clock signals CL1–CL4. The clock signals CL1–CL4 are generated at a 1,200 kilohertz repetition rate and are shifted slightly in phase relative to each other so as to provide four clock signals synchronized in repetition rate with the bit rate of the incoming data stream and slightly delayed relative to each other. For example, the CL1 clock signal is phased relative to the incoming data stream so that a CL1 pulse occurs in the first quarter of each bit position of the incoming SPDATA signal. The CL2–CL4 signals may be all delayed by a predetermined amount such as 50 to 100 microseconds relative to the CL1 signal and relative to each other in accordance, for example, with the order of the numerical designations thereof.

As is subsequently described in greater detail, the receiver may turn on during only one of the time slots which make up a major data frame. For example, the receiver may be energized for about one second and deenergized for about seven seconds during each eight second major data frame. During the "off" time of the receiver, the RCV signal assumes a low signal level and both analog gates 528 and 530 are inhibited. However, the capacitor 538 retains (stores) the voltage developed thereacross during the "on" time of the receiver and, when the receiver is again energized, the VCO 536 is locked approximately in phase with the incoming SPDATA signal thereby facilitating the synchronization of the timing recovery circuit. Also, since the frequency of the VCO 536 is held nearly constant during the time that the receiver is off, the "off" time of the receiver can be timed with great accuracy thus permitting the receiver reenergization for receipt of the data signal in the desired time slot of the next major data frame.

B. Sync And Decode Logic Circuit

Figure 5:
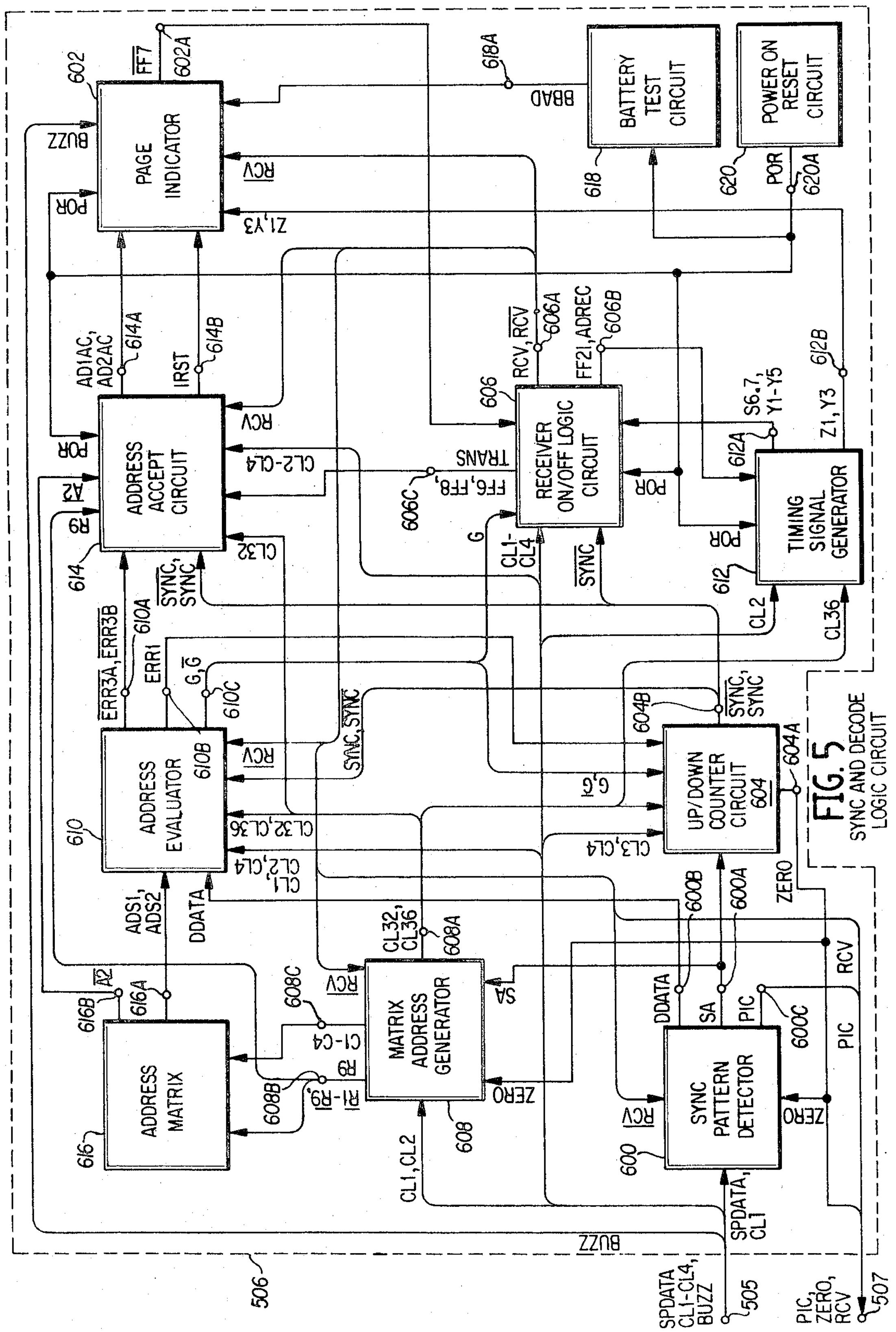
FIG. 5 is a more detailed functional block diagram of the sync and decode logic circuit of FIG. 3.

The sync and decode logic circuit 506 of FIG. 3 is illustrated in greater detail in the functional block diagram of FIG. 5. Referring to FIG. 5, the split phase data or SPDATA signal at the collective input terminal 505 of the sync and decode logic circuit may be applied to a sync pattern detector 600, and the BUZZ signal from the timing recovery circuit 504 of FIG. 4 may be applied to a page indicator 602. The CL1 clock signal from the timing recovery circuit 504 of FIG. 4 may also be applied to the sync pattern detector 600 via the collective input terminal 505 and the CL3–CL4 signals may be applied to an up/down counter circuit 604. The CL1–CL4 clock signals may be applied to a receiver on/off logic circuit 606. The CL1 and CL2 signals from the input terminal 505 may be applied to a matrix address generator 608 and, together with the CL4 clock signal, may be applied to an address evaluator 610. The CL2 signal may be applied to the timing signal generator 612 and the CL2–CL4 signals may be applied to an address accept circuit 614.

A "sync acquisition detected" or SA signal from an output terminal 600A of the sync pattern detector 600 may be applied to the matrix address generator 608 and to the up/down counter circuit 604. A delayed data or DDATA output signal from an output terminal 600B of the sync pattern detector 600 may be applied to the address evaluator 610 and the sync acquisition pattern complement or P1C output signal may be applied from an output terminal 600C of the sync pattern detector 600 to the collective output terminal 507 of the sync and decode logic circuit for application to the timing recovery circuit 504 of FIG. 4.

With continued reference to FIG. 5, a "zero count" or ZERO signal from an output terminal 604A of the up/down counter circuit 604 may be applied to the collective output terminal 507, to the sync pattern detector 600 and to the matrix address generator 608. A SYNC and a $\overline{\text{SYNC}}$ signal from a collective output terminal 604B from the up/down counter circuit 604 may be applied to the address evaluator 610 and to the address accept circuit 614. The $\overline{\text{SYNC}}$ signal from the collective output terminal 604B may also be applied to the receiver on/off logic circuit 606.

The matrix address generator 608 provides two framing signals CL32 and CL36 which may be applied via a collective output terminal 608A to the up/down counter circuit 604 and to the address evaluator 610. The CL32 signal from the matrix address generator 608 may also be applied to the address accept circuit 614 and the CL36 signal may be applied to the timing signal generator 612. Row scan signals $\overline{\text{R1}}$–$\overline{\text{R9}}$ are generated by the matrix address generator 608 and may be applied via a collective output terminal 608B to an address matrix 616. In addition, the row scan signal R9 may be applied to the address accept circuit 614. The column scan signals C1–C4 may be applied from the matrix address generator 608 to the address matrix 616 via a collective output terminal 608C.

The address matrix 616 provides one or more address signals, e.g., ADS1 and ADS2, in response to the scanning of the address matrix by the row and column scan signals $\overline{\text{R1}}$–$\overline{\text{R9}}$ and C1–C4. The ADS1 and ADS2 address signals may be applied to the address evaluator 610 via an output terminal 616A. If only one address signal, e.g., ADS1, is provided, an "address number 2 inhibit" or $\overline{\text{A2}}$ signal may be applied via the output terminal 616B to the address accept circuit 614.

The address evaluator 610 evaluates the incoming data signal DDATA with respect to the locally generated address signals ADS1 and ADS2 and generates address error signal ERR3A and ERR3B which may be applied via an output terminal 610A to the address accept circuit 614. An error signal ERR1 may be applied via an output terminal 610B to the up/down counter circuit 604 and "sync maintenance gating" or G and $\overline{\text{G}}$ signals from the address evaluator 610 may be applied via an output terminal 610C to the up/down counter 604. The G output signal from the collective output terminal 610C may also be applied to the receiver on/off logic circuit 606.

The address accept circuit 614 evaluates the address error data and determines whether or not an acceptable address has been received. An "address accept" signal AD1AC or AD2AC is generated by the address accept circuit for the accepted addresses assigned to the receiver and may be applied via an output terminal 614A of the address accept circuit 614 to the page indicator 602. AN "indicator reset" or IRST output signal from the address accept circuit 614 may be applied via an output terminal 614B to the page indicator 602.

The receiver on/off logic circuit 606 controls the energization and deenergization of the receiver during the successive major data frames. The "receiver on" and "receiver off" signals RCV and $\overline{\text{RCV}}$, respectively, are provided at a collective output terminal 606A of the receiver on/off logic circuit 606. The RCV signal may be applied to the collective output terminal 507 of the sync decode and logic circuit and to the address accept circuit 614. The $\overline{\text{RCV}}$ signal from the collective output terminal 606A of the receiver on/off logic circuit 606 may be applied to the sync pattern detector 600, the matrix address generator 608, the address evaluator 610, and the page indicator 602. The "timing circuit reset" signal FF21 and the "address received" or ADREC signal may be applied via an output terminal 606B of the receiver on/off logic circuit 606 to the timing signal generator 612. The "address transfer" or TRANS signal, the FF6 signal and the FF8 signal from the collective output terminal 606C of the receiver on/off logic circuit 606 may be applied to the address accept circuit 614.

The timing signal generator 612 may provide various timing signals S6.7 and Y1–Y5 at an output terminal 612A which may be applied to the receiver on/off logic circuit 606. Additional timing signals Z1 and Y3 may be applied from an output terminal 612B of the timing signal generator 612 to the page indicator 602.

The sync and decode logic circuit 506 of FIG. 5 may also include a battery test circuit 618 and a power on reset circuit 620. The power on reset circuit 620 may provide a "power on reset" or POR output signal when the receiver is initially energized. The POR signal may be applied to the timing signal generator 612, the receiver on/off logic circuit 606, the address accept circuit 614, the page indicator 602 and the battery test circuit 618 to reset these circuits when the power is initially turned on. The battery test circuit 618 may test the receiver battery voltage when the power is initially turned on and may provide a "battery bad" or BBAD output signal if the battery output voltage is below a predetermined level.

In operation, the split phase data signal SPDATA recovered by the discriminator circuit 520 in the receiver of FIG. 3 is clocked into the sync pattern detector 600 of FIG. 5 by the CL1 clock signal. When the initial 4 bit sync acquisition signal SA or its complement P1C is recognized by the sync pattern detector 600, the up/down counter circuit 604 is incremented by a count of one by the SA signal. The P1C signal applied to the timing recovery circuit 504 of FIG. 4 changes the phase of the CL1 signal if the sync acquisition signal complement is recognized.

With continued reference to FIG. 5, the address evaluator 610 thereafter counts the number of binary ONE's in the subsequent 32 bits of the sync acquisition signal in response to the framing signals CL32 and CL36 provided by the matrix address generator 608. If one or more binary ONE's are counted, the up/down counter circuit 604 is decremented by a count of one. If no binary ONE's are counted, and up/down counter circuit 604 is incremented by a count of one.

If the up/down counter circuit 604 reaches a count of 3 during the sync acquisition portion of the incoming SPDATA signal indicating that the bit error rate of the incoming digital data signal SPDATA is below a predetermined value, the SYNC signal assumes a high signal level allowing the address portion of the SPDATA signal forwarded as the DDATA signal to thereafter be evaluated by the address evaluator 610.

The address portion of the DDATA signal, i.e., the 30 addresses described in FIG. 2 without the sync maintenance signal SB, is evaluated by scanning of the address matrix 616 in synchronism with each address portion of the incoming DDATA signal and by successively evaluating differences in signal level between corresponding bits of the locally generated address signals ADS1 and ADS2 and the delayed data signal DDATA from the sync pattern detector 600. If the number of differences in signal level between corresponding bits of the address signals ADS1 and ADS2 and the DDATA signal is less than a predetermined number, the address accept circuit 614 is conditioned by one of the ERR3A and ERR3B signals to provide an address accept signal when the RCV signal assumes a low signal level. When the address is accepted and the receiver signal RCV assumes a low signal level, an audible page indicating signal is provided by a page indicator 602 at the end of the time slot.

The sync maintenance portion SB of the incoming SPDATA signal is also checked against a sync maintenance signal assigned to the receiver and stored in the address matrix 616 as, for example, the last four bits of the ADS1 signal. Evaluation of this sync maintenance portion SB ensures that the bit error rate of the incoming data signal does not exceed a predetermined value throughout the remainder of the time slot. This evaluation also ensures that the receiver is receiving a transmitter in the proper paging system when two or more systems are operating in the same paging area.

Each address portion of the incoming DDATA signal contains at least six binary ONE's in the preferred embodiment described, whereas the 32 bit o's portion of the sync acquisition signal contains less than six binary ONE's. A count of 6 in a counter responsive only to binary ONE's in the address evaluator 610 thereby may indicate that an address rather than a O's portion is being evaluated. This count of 6 in coincidence with the CL36 framing signal causes the G signal to assume a high signal level and thereafter recognition of any sync acquisition patterns other than SB decrements the up/down counter circuit 604 and recognition of any sync maintenance patterns SB increments the up/down counter circuit 604.

If, at the end of the time slot, the SYNC signal is still at a high signal level indicating that the bit error rate of the SPDATA was acceptable throughout the time slot, the receiver circuits are deenergized until the SPDATA signal is due to arrive in that same time slot during the next major data frame. To deenergize the receiver circuits for the desired time interval, the $\overline{RCV}$ signal from the reciever on/off logic circuit 606 assumes a low signal level for approximately 6.72 seconds (when the data frame is made up of eight one-second time slots) in response to the S6.7 signal from the timing signal generator 612. The receiver on/off logic circuit 606 thereafter energizes the receiver circuits immediately before the data signal SPDATA is due to arrive in the selected time slot during the next major data frame.

As was previously mentioned, the page indicator 602 may generate an audible alarm when an address has been successively evaluated during a selected time slot. Where two different addresses are assigned to a receiver, e.g., each address indicating that a different paging party or group of parties desires to communicate with the subscriber, two different audible tones may be provided by the page indicator 602. The BUZZ signal from the timing recovery circuit indicating that the receiver is energized may, for example, be a 2.1 kilohertz signal and may be gated to an audible indicator such as an electromagnetic transducer as a steady tone in response to the recognition of one of the address signals ADS1 assigned to the receiver and as a chopped or pulsating tone in response to the recognition of the other address signal ADS2 assigned to the receiver.

1. Sync Pattern Detector

The sync pattern detector 600 of FIG. 5 is illustrated in greater detail in the functional block diagram of FIG. 6. With reference to FIG. 6, the split phase data signal SPDATA from the collective output terminal 505 of the timing recovery circuit 504 of FIG. 4 may be applied through one or more shaping amplifiers 622 to the data input terminal of a four bit shift register 624. The CL1 clock signal from the collective input terminal 505 of the timing recovery circuit 504 of FIG. 4 may also be applied to the clock input terminal C of the shift register 624. The $\overline{RCV}$ signal from the output terminal 606A of the receiver on/off logic circuit 606 of FIG. 5 may be applied to the reset input terminal R of the shift register 624.

Assuming that the 4 bit sync acquisition pattern SA is 1101, the Q1, Q2 and Q4 output signals from the true output terminals of the first, second and fourth stages of the shift register 624 may be applied to three input terminals of a four input terminal AND gate 626 and the $\overline{Q3}$ output signal from the false output terminal of the third stage of the shift register 624 may be applied to the fourth input terminal of the AND gate 626. The "pattern recognized" or P1 output signal from the AND gate 626 may be applied to one input terminal of a two input terminal OR gate 628 and "the sync acquisition pattern detected" or SA output signal from the OR gate 628 may be provided at an output terminal 600A of the sync pattern detector 600 for application to the up/down counter circuit 604 and the matrix address generator 608 of FIG. 5.

The $\overline{Q1}$, $\overline{Q2}$, and $\overline{Q4}$ signals from the false output terminals first, second and fourth stages, respectively, of the shift register 624 may be applied to three input terminals of a four input terminal AND gate 630 and the Q3 signal from the true output terminal of the third stage of the shift register 624 may be applied to the fourth input terminal of the AND gate 630. The "sync pattern complement detected" or P1C output signal from the AND gate 630 may be applied to one input terminal of a two input terminal AND gate 632 and to the output terminal 600C of the sync pattern detector 600. The ZERO signal from the output terminal 604A of the up/down counter circuit 604 of FIG. 5 may be applied to the other input terminal of the AND gate 632 and the output signal from the AND gate 632 may be applied to the other input terminal of the OR gate 628.

In operation and with continued reference to FIG. 6, the $\overline{RCV}$ signal resets the shift register 624 when the receiver is first turned off. The SPDATA signal is shaped by the shaping amplifiers 622 and is clocked into the shift register 624 by the CL1 clock signal.

When the four bit sync acquisition pattern SA is recognized by the AND gate 626, the SA signal assumes a high signal level for the duration of from one CL1 clock pulse to the next CL1 clock pulse. If the count in the up/down counter 604 of FIG. 5 is zero, and the complement of the four bit sync acquisition pattern SA is recognized by the AND gate 630, the SA output signal assumes a high signal level and the P1C signal assumes a high signal level changing the phase of the CL1 clock signal as was previously described. When either the sync acquisition pattern or its complement is recognized by the AND gate 626 and 630, the high level SA output signal increments the up/down counter circuits 604 as will hereinafter be described in connection with FIG. 7 and thereafter the AND gate 632 is inhibited and only the successful recognition of the sync acquisition pattern SA by the AND gate 626 will provide a high signal level SA output signal.

In addition, the output signal Q1 from the true output terminal of the first stage of the shift register 624 is provided at the output terminal 600B as the DDATA output signal. This DDATA signal is utilized by the address evaluator 610 as will hereinafter be described in greater detail in connection with FIG. 10.

2. Up/Down Counter Circuit

The up/down counter circuit 604 of the sync and decode logic circuit of FIG. 5 is illustrated in greater detail in the functional block diagram of FIG. 7. Referring now to FIG. 7, the CL3 clock signal from the collective input terminal 505 of the sync and decode logic circuit 506 of FIG. 5 may be applied to one input terminal of a six input terminal AND gate 634, a five input terminal AND gate 636, a four input terminal AND gate 638, and three five input terminal AND gates 640–644. The CL4 clock signal from the collective input terminal 505 of the sync and decode logic circuit 506 of FIG. 5 may be applied to one input terminal of four two input terminal AND gates 646–652.

With continued reference to FIG. 7, the sync pattern decoded or SA signal from the output terminal 600A of the sync pattern detector 600 of FIG. 20 may be applied to one input terminal of the AND gate 636 and through an inverter 641 to one input terminal of the AND gate 640. The ERR1 output signal from the output terminal 610B of the address evaluator 610 of FIG. 5 may be applied to one input terminal of each of the AND gates 642 and 644 and through an inverter 654 to one input terminal of each of the AND gates 634 and 638.

Figure 10:
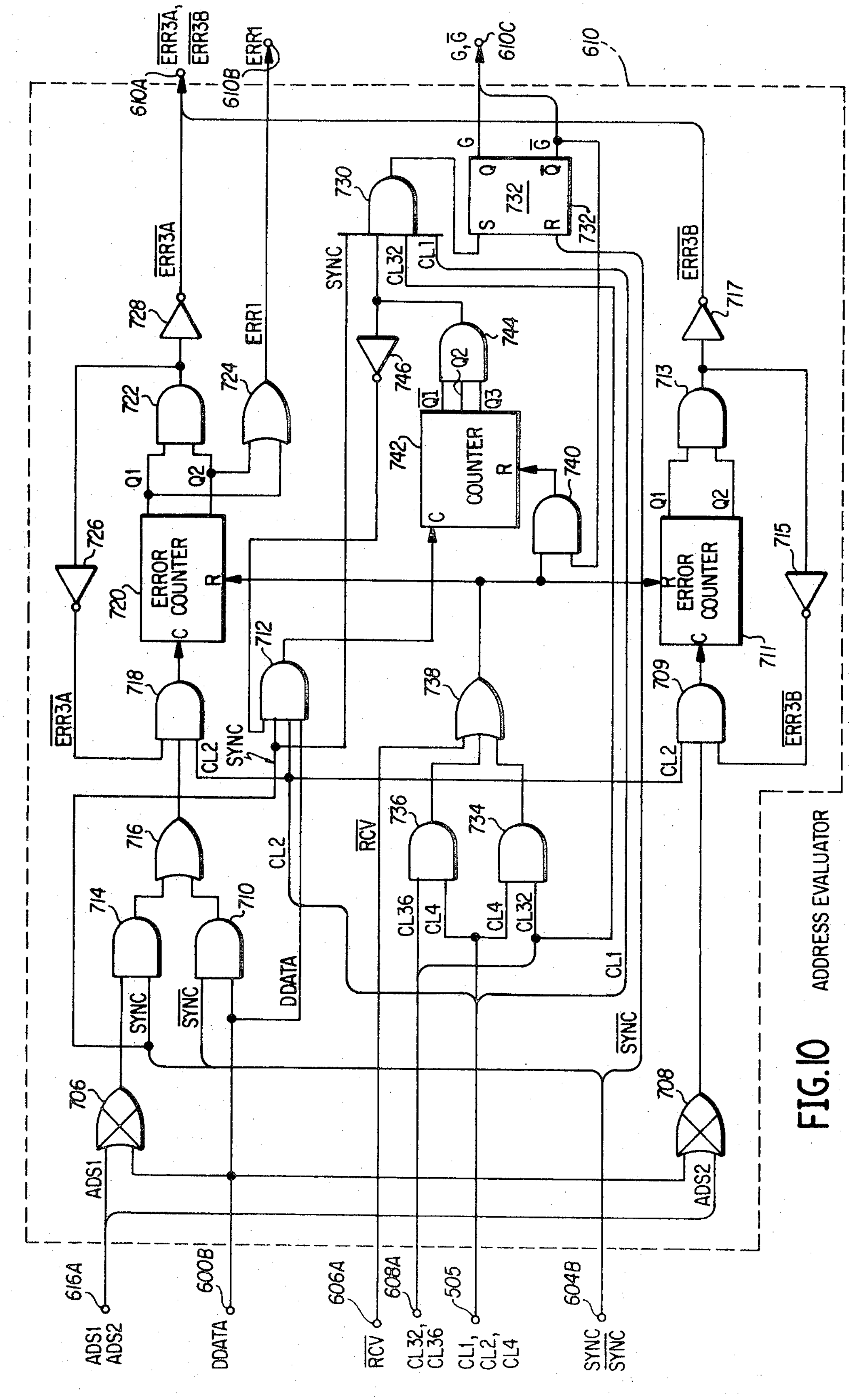
FIG. 10 is a more detailed functional block diagram of the address evaluator of FIG. 5.

The "first address signal received" or G output signal from the output terminal 610C of the address evaluator 610 of FIGS. 5 and 10 may be applied to one input terminal of the AND gate 642 and the $\overline{G}$ signal from the output terminal 610C may be applied to one input terminal of each of the AND gates 636 and 640. The CL32 framing signal from the output terminal 608A of the matrix address generator 608 of FIGS. 5 and 8 may be applied to one input terminal of each of the AND gates 648 and 634 and the output signal CL36 from the collective output terminal 608A of the matrix address generator 608 may be applied to one input terminal of each of the AND gates 646 and 636–642.

The output signal from the AND gate 634 may be applied to one input terminal of a three input terminal OR gate 656 and the output signal from the OR gate 656 may be applied to the "up" input terminal of a conventional two stage up/down counter 659. The output signal from the AND gate 636 may be applied to a second input terminal of the OR gate 656 and the output signal from the AND 638 may be applied to one input terminal of a two input terminal AND gate 658, the output signal from which may be applied to the third input terminal of the OR gate 656.

The output signal from the AND gate 640 may be applied to one input terminal of a three input terminal OR gate 660 and the output signal from the AND gate 642 may be applied to a second input terminal of the OR gate 660. The output signal from the AND gate 644 may be applied through an inverter 662 to the clock input terminal C of a conventional bistable multivibrator or flip-flop 664 and to the third input terminal of the OR gate 660. The output signal from the OR gate 660 may be applied to the "down" input terminal of the up/down counter 659.

The output signals $\overline{Q1}$ and $\overline{Q2}$ from the false output terminals of the first and second stages, respectively, of the up/down counter 659 may be applied to the input terminals of a two input terminal AND gate 666. The output signals Q1 and Q2 from the true output terminals of the first and second stages, respectively, of the up/down counter 659 may be applied to the input terminals of a tow input terminal AND gate 668. The ZERO output from the AND gate 666 may be applied to the second input terminal of the AND gate 650, to the output terminal 604A, and through an inverter 670 to one input terminal of each of the AND gates 634, 640-644. The THREE output signal from the AND gate 668 may be applied to the other input terminal of the AND gate 652 and through an inverter 672 to input terminal of each of the AND gates 634 and 636 and to the other input terminal of the AND gate 658.

The output signal from the AND gate 652 may be applied to the set input terminal S of a bistable multivibrator or flip-flop 674 and the output signal from the AND gate 650 may be applied to the reset input terminal R of the flip-flop 674. The SYNC output signal from the true output terminal of the flip-flop 674 may be provided at the collective output terminal 604B and may be applied to an input terminal of the AND gate 638. The $\overline{SYNC}$ signal from the false or $\overline{Q}$ output terminal of the flip-flop 674 may be applied to the collective output terminal 604B and to an input terminal of each of the AND gates 634 and 644.

The output signal from the AND gate 646 may be applied to the set input terminal S of the flip-flop 664 and the output signal from the AND gate 648 may be applied to the reset input terminal R of the flip-flop 664.

The set steering terminal D of flip-flop 664 may be grounded and the "address gate" or ADGT output signal from the true or Q output terminal of the flip-flop 664 may be applied to another input terminal of the AND gate 644.

In operation and with continued reference to FIG. 7, the $\overline{RCV}$ signal resets the up/down counter 659 in the up/down counter circuit 604 to zero by clearing the up/down counter 659. The $\overline{ZERO}$ signal from the counter 659 responsive AND gate 666 assumes a high signal level inhibiting the AND gates 634 and 640–644. When the AND gate 668 is inhibited, the THREE signal assumes a low signal level enabling the AND gates 634 and 636. Since the AND gate 634 is also inhibited by the ZERO signal, ony the AND gate 636 is enabled when the count in the up/down counter 659 is zero.

When the first four bit sync acquisition pattern SA or its complement is recognized by the sync pattern detector 600, the SA signal assumes a high signal level and is gated through the AND gate 636 by the CL3 clock signal and the CL36 framing signal. The output signal from the AND gate 636 assumes a high signal level and is applied to the "up" input terminal of the up/down counter 659 via the OR gate 656 to increment the up/-down counter by a count of one. The ZERO signal from the AND 666 thereafter assumes a low signal level and the AND gates 640–644 and 634 are all enabled, permitting the counter 659 to be either incremented or decremented.

Prior to reaching a count of three and setting the sync flip-flop 674, the up/down counter 659 may be incremented by the successful recognition of the four bit SA portion of the sync acquisition signal, or by the recognition of the 32 bit 0's portion of the sync acquisition signal. After the sync flip-flop 674 is set in response to the successful recognition of the sync acquisition signal, the sync maintenance pattern SB can either increment or decrement the up/down counter 659. TABLE II, which follows, provides a listing of the combination of signal conditions which will effect incrementation of the up/down counter 659:

TABLE II

| Gate Designation | Signal Combinations (High Level) | Signal Function |
|---|---|---|
| AND gate 634 | $\overline{ZERO}$ | count not zero |
| | $\overline{three}$ | count not three |
| | CL32 | end of 32 bit 0's or address |
| | $\overline{SYNC}$ | sync flip-flop reset |
| | CL3 | clock (3rd phase) |
| | ERR1 | error count less than 1 in either 32 bit 0's portion of sync acquisition signal or SB pattern |
| AND gate 636 | $\overline{THREE}$ | count not three |
| | SA | sync acquisition pattern decoded |
| | CL36 | end of SA or SB four bit pattern |
| | $\overline{G}$ | sync acquisition signal still being evaluated |
| | CL3 | clock (3rd phase) |
| AND gate 658 | SYNC | sync flip-flop set |
| | CL36 | end of SA or SB four bit pattern |
| | $\overline{ERR1}$ | error count less than 1 |
| | CL3 | clock (3rd phase) |
| | $\overline{THREE}$ | count not three |

It can be seen from the above Table II that the $\overline{THREE}$ signal prevents the counter 659 from being incremented beyond a count of three. Moreover, the $\overline{ERR1}$ signal can indicate either that less than one binary ZERO appeared in the 32 bit 0's portion of the sync acquisition signal or that less than one error appeared during the evaluation of a sync maintenance or SB pattern. However, the framing signals CL32 and CL36 differentiate between these two possibilities, causing the AND gate 634 to respond to the recognition of the SB or sync maintenance signal.

Once the up/down counter 659 is at a count of one or more, the counter 659 may be decremented through the enabled AND gates 640–642. Table III below illustrates the various combinations of signal conditions which may decrement the up/down counter 659.

TABLE III

| Gate Designation | Signal Combinations (High Level) | Signal Function |
|---|---|---|
| AND gate 640 | $\overline{G}$ | sync acquisition signal still being evaluated |
| | $\overline{ZERO}$ | count not zero |
| | $\overline{SA}$ | sync acquisition pattern not decoded |
| | CL36 | end of SA or SB four bit pattern |
| | CL3 | clock |
| AND gate 642 | G | first address signal received |
| | $\overline{ZERO}$ | count not zero |
| | ERR1 | error count one or more |
| | CL36 | end of SA or SB four bit pattern |
| | CL3 | clock |
| AND gate 644 | $\overline{ZERO}$ | count not zero |
| | $\overline{SYNC}$ | sync flip-flop set |
| | ADGT | address gate (high for 32 bits between adjacent 4 bit sync patterns) |
| | ERR1 | error count one or more |
| | CL3 | clock |

It can be seen from the above Table III that an erroneous four bit sync acquisition pattern SA will decrement the up/down counter 659 through the AND gate 640, and that one or more binary ONE's in the 32 bit 0's portion of the sync acquisition signal will decrement the up/down counter 659 through the AND gate 644. Moreover, after the first address signal is received, the G signal assumes a high signal level and unsuccesssful recognition of the four bit sync maintenance pattern SB indicated by a high signal level ERR1 signal decrements the counter 659 through the AND gate 642.

If the up/down counter 659 does not reach a count of three and set the sync flip-flop 674 during the 112 bit sync acquisition portion of the incoming SPDATA signal, the addresses received during the remainder of the time slot are not decoded. A count of three may be reached by the up/down counter during the 112 bit sync acquisition portion of the incoming SPDATA signal in the following ways:

TABLE IV

| | Sync Acquisition Signal | | | | | | |
|---|---|---|---|---|---|---|---|
| | SA | 32 O's | SA | 32 O's | SA | 32 O's | SA |
| | 1 | 2 | 3 | 3 | 3 | 3 | 3 |
| | 0 | 0 | 1 | 2 | 3 | 3 | 3 |
| | 1 | 2 | 1 | 2 | 3 | 3 | 3 |
| | 1 | 0 | 1 | 2 | 3 | 3 | 3 |
| Count | 0 | 0 | 0 | 0 | 1 | 2 | 3 |
| in | 0 | 0 | 1 | 2 | 1 | 2 | 3 |
| up/dn | 1 | 0 | 0 | 0 | 1 | 2 | 3 |
| cntr. | 1 | 0 | 1 | 0 | 1 | 2 | 3 |
| 659 | 1 | 0 | 1 | 2 | 1 | 2 | 3 |
| | 1 | 2 | 1 | 0 | 1 | 2 | 3 |
| | 1 | 2 | 1 | 2 | 1 | 2 | 3 |

Of course, the sync flip-flop 674 may be subsequently reset before the end of the time slot if the bit error rate of the incoming SPDATA signal is excessive as indicated by the unsuccessful recognition of a sufficient number of successive sync signals after the flip-flop 674 is reset at the end of a time slot. In this event, the SPDATA signal is evaluated in the next successive time slots until the bit error rate of the SPDATA signal is found to be within the desired tolerances. When the bit error rate of the SPDATA signal is within a desired tolerance, the sync flip-flop 674 will still be set at the end of the time slot and the receiver will be deenergized for a predetermined time interval and then reenergized just before the SPDATA signal is due to arrive in the same time slot during the next major data frame.

3. Matrix Address Generator

The matrix address generator 606 of the sync and decode logic circuit of FIG. 5 is illustrated in greater detail in the functional block diagram of FIG. 8.

With reference to FIg. 8, the CL1 clock signal from the collective output terminal 505 of the timing recovery circuit of FIG. 4 may be applied to the clock input terminal C of a suitable conventional two stage ring counter 680 and the CL2 clock signal from the collective output terminal 505 of the timing recovery circuit of FIG. 4 may be applied to one input terminal of a three input terminal AND gate 682. The SA signal from the output terminal 600A of the sync pattern detector 600 of FIG. 6 may be applied to another input terminal of the AND gate 682 and the ZERO signal from the output terminal 604A of the up/down counter circuit 604 of FIG. 7 may be applied to the other input terminal of the AND gate 682. The output signal from the AND gate 682 may be applied to the reset input terminal R of the ring counter 680 and to a reset input terminal R of a suitable conventional five stage twisted ring counter 684.

The output signals Q1, $\overline{Q1}$, Q2 and $\overline{Q2}$ from the two stages of the ring couner 680 may be applied to a suitable gating circuit 686 to generate successive column scan signals C1–C4 which may be provided at the output terminal 608C of the matrix address generator 608. The C1 signal from the gating circuit 686 may also be applied to the clock input terminal C of the twisted ring counter 684 and the C4 signal from the gating circuit 686 may be applied to one input terminal of a pair of two input terminal AND gates 688 and 690.

The R1–R9 output signals from the 1–9 output terminals of the twisted ring counter 684 may be gated through a plurality of NAND gates generally indicated at 692 and the row scan or $\overline{R1}$-$\overline{R9}$ output signals from the NAND gates may be applied to the collective output terminal 608B of the matrix address generator 608 for application to the address matrix circuit 616 and the address accept circuit of FIG. 5.

With continued reference to FIG. 8, The R8 signal from the twisted ring counter 684 may be applied to the second input terminal of the AND gate 688 and the R9 signal from the twisted ring counter 684 may be applied to the second input terminal of the AND gate 690. The framing signal CL32 and CL36 from the output terminals of the AND gates 688 and 690 respectively may be provided at the collective output terminal 608A of the matrix address generator 608 for application to the address evaluator 610, the up/down counter circuit 604 and the timing signal generator 612 of FIG. 5.

In operation, the two stage ring counter is clocked at a 1,200 bit per second rate by the CL1 clock signal and generates the successive column scanning signals C1–C4 once during every four bits of the clock signal. The C1 signal clocks the twisted ring counter 684 and the row scan signals R1–R9 are generated once during every 9 column scan signals. Since both the ring counters 680 and 684 are started at the same time when the first sync acquisition pattern is recognized, the column and row scanning signals are synchronized with the incoming 32 bit patterns which occur intermediate the sync acquisition and sync maintenance signals.

The C4 column scanning signal and the R8 row scanning signal are coincident at exactly the end of the 32 bit pattern. These two signals thus generate the CL32 signal exactly 32 pulses after the recognition of the SA pattern. The R9 and C4 signals are coincident at exactly the 36th pulse in the DATA signal after the recognition of the SA signal. Thus, the CL36 signal generated in response to the C4 and R9 signals occurs at exactly the beginning of the 32 bit 0's pattern and the subsequently received address patterns.

4. Address Matrix Circuit

The address matrix circuit 616 of the sync and decode logic circuit 506 of FIG. 5 is illustrated in greater detail in the functional block diagram of FIG. 9.

Referring now to FIG. 9, the $\overline{R1}$–$\overline{R9}$ row scan signals from the output terminal 608B of the address matrix generator 608 of FIG. 5 are applied respectively to the R1'–R9' input terminals of one or more suitable conventional 9 × 4 address matrix circuits such as those illustrated at 694A and 694B. Where it is desired to assign more than two addresses to a particular receiver, additional address matrices may be provided.

Each of the address matrices 694 is preferably a conventional blown fuse diode matrix in which all of the ouput lines C1'–C4' are connected to each of the row input lines R1'–R9' through diodes and a fuse link. The address assigned to the receiver may be permanently stored in the matrix by blowing selected ones of the fuses in series with the diodes so that specific ones of the rows and columns are disconnected and cannot be grounded by the input signals $\overline{R1}$–$\overline{R9}$ during the scanning of the address matrix. In this manner, when a particular column output line is read in response to the column scan signals C1–C4, those row-column connections which are open provide a binary ONE output signal when read.

The C1'–C4' output terminals of the address matrix 694A are connected respectively to one input terminal of each of four two input terminal AND gates 696–699 and are each connected through associated resistors 700–703 to a source of positive potential.

The C1–C4 column scan signals from the output terminal 608C of the matrix address generators 608 of FIG. 5 are applied, respectively, to the other input terminal of each of the AND gates 696–699. The output signals from the AND gates 696–699 are each applied to one input terminal of a four input terminal OR gate 704 and the output signal from the OR gate 704 is provided at an output terminal 616A as the ADS1 address signal.

The circuit utilized to generate a second local address utilizing the address matrix 694B may be identical to that described in connection with the address matrix 694A and will therefore not be described in detail. The second address signal ADS2 may also be provided at the collective output terminals 616A of the address matrix circuit for application to the address evaluator 610 of FIG. 5.

In addition, the output signal $\overline{A2}$ indicating that the second address matrix 694B is not in use may be provided at an output terminal 616B of the address matrix circuit 616. This signal $\overline{A2}$ may be utilized by the address accept circuit 616 of FIG. 5 as is subsequently described in detail in connection with FIG. 25.

5. Address Evaluator

The address evaluator 610 of the sync and decode logic circuit 506 of FIG. 5 is illustrated in greater detail in the functional block diagram of FIG. 10.

With reference now to FIG. 10, the ADS1 and ADS2 address signals from the collective output terminal 616A of the address matrix circuit 616 of FIG. 9 may be applied respectively to one input terminal of a two input terminal "exclusive or" (EXOR) gate 706 and to one input terminal of a two input terminal EXOR gate 708. The DDATA signal from the output terminal 600B of the sync pattern detector 600 of FIG. 6 may be applied to the other input terminals of each of the EXOR gates 706 and 708, to one input terminal of a two input terminal AND gate 710 and to one input terminal of a four input terminal AND gate 712.

The output signals from the EXOR gates 706 and 708 may be applied, respectively, to one input terminal AND gate 714 and to one input terminal of a three input terminal AND gate 709. The output signals from the AND gates 714 and 709 may be applied, respectively, to one input terminal of a two input terminal OR gate 716 and to the clock input terminal C of a conventional error counter 711 such as a two stage binary counter. The output signal from the OR gate 716 may be applied to one input terminal of a three input terminal AND gate 718 and the output signal from the AND gate 718 may be applied to the clock input terminal C of a suitable conventional error counter 720 such as a two stage binary counter.

The Q1 output signal from the true output terminal of the first stage of the error counter 720 may be applied to one input terminal of a two input terminal AND gate 722 and to one input terminal of a two input terminal OR gate 724. The Q2 output signal from the true output terminal of the second stage of the error counter 720 may be applied to the other input terminal AND gate 722 and to the other input terminal of the OR gate 724 and the output signal ERR1 from the OR gate 724 may be provided at the output terminal 610B of the address evaluator 610 for application to the up/-down counter circuit 604 of FIG. 7. The output signal from the AND gate 722 may be applied through an inverter 726 to an input terminal of the AND gate 718 and through another inverter 728 to the collective output terminal 610A as the $\overline{ERR3A}$ address error signal.

The Q1 and Q2 output signals from the true output terminals of the respective first and second stages of the error conductor 711 may be applied to the respective input terminals of a two input terminal AND gate 713. The output signal ERR3B from the AND gate 713 may be applied through an inverter 715 to an input terminal of the AND gate 709 and through an inverter 717 to the collective output terminal 610A of the address evaluator 610 as the $\overline{ERR3B}$ address error signal for application to the address accept circuit 614 of FIG. 5.

The SYNC signal from the collective output terminal 604B of the up/down counter circuit 604 of FIGS. 5 and 7 may be applied to the other input terminal of the AND gate 714, to a second input terminal of the AND gate 712 and to one input terminal of a four input terminal AND gate 730. The $\overline{SYNC}$ signal from the collective terminal 604B may be applied to the other input terminal of the AND gate 710 and to the reset input terminal R of a conventional bistable multivibrator or flip-flop 732. The output signal from the AND gate 710 may be applied to the other input terminal of the OR gate 716.

The CL32 and CL36 framing signals from the collective output terminal 608A of the matrix address generator 608 of FIGS. 5 and 8 may be applied, respectively, to one input terminal of a two input terminal AND gate 734 and to one input terminal of a two input terminal AND gate 736. The CL32 framing signal may also be applied to an input terminal of the AND gate 730 from the terminal 608A of the matrix address generator 608 of FIG. 8.

With continued reference to FIG. 10, the output signal from the AND gate 736 may be applied to one input terminal of a three input terminal OR gate 738 and the output signal from the AND gate 738 734 may be applied to a second input terminal of the OR gate 738. The output signal from the OR gate 738 may be applied to the reset input terminals R of the error counters 711 and 720 and to one input terminal of a two input terminal AND gate 740. The output signal from the AND gate 740 may be applied to the reset input terminal R of a conventional three stage counter 742 and the output signals from the false output terminal of the first stage and the true output terminals of the second and third stages of the counter 742 may each be applied to an input terminal of a three input terminal of an AND gate 744. The output signal from the AND gate 744 may be applied to an input terminal of the AND gate 730 and through an inverter 746 to an input terminal of the AND gate 712, the output signal from which may be applied to the clock input terminal C of the counter 742. The output signal from the AND gate 730 may be applied to the set input terminal S of the flip-flop 732 and the G and $\overline{G}$ output signals from the true and false output terminals, respectively, of the flip-flop 732 may be provided at the collective output terminal 610C of the address evaluator 610 for application to the up/-down counter circuit 604 of FIG. 7 and the receiver on/off logic circuit 606 of FIG. 5. The $\overline{G}$ signal may also be applied to the second input terminal of the AND gate 740 in FIG. 24.

The CL1 clock signal from the collective input terminal 505 of the sync and decode logic circuit 506 of FIG. 5 may be applied to an input terminal of the AND gate 730 and the CL2 clock signal from the terminal 505 may be applied to one input terminal of each of the AND gates 709, 712, and 718. The CL4 clock signal from the input terminal 505 may be applied to one input terminal of each of the AND gates 734 and 736. The $\overline{RCV}$ signal from the collective output terminal 606A of the receiver on/off logic circuit 606 of FIGS. 5 and 14 may be applied to the third input terminal of the OR gate 738.

In operation and with continued reference to FIG. 10 the ADS1 and ADS2 address signals from the address matrix 616 are serially applied to the EXOR gates 706 and 708 for evaluation with respect to the delayed data signal DDATA from the sync pattern detector 600. The signal level of each bit of the DDATA signal is compared with the signal level of the corresponding bit of the locally generated address signals ADS1 and ADS2 and each time a difference in signal level exists between the bits of the DDATA signal and the locally generated address signals ADS1 and ADS2, the output signal from the EXOR gates 706 and 708 associated therewith assume a high signal level.

If the SYNC signal is at a high signal level indicating that the up/down counter circuit 604 has successfully counted to three, i.e., has acquired sync, during the sync acquisition portion of the DDATA signal, the output signal from the EXOR gate 706 is applied through the OR gate 716 to the AND gate 718. The output signal from the EXOR gate 708 is applied to the AND gate 709 irrespective of the condition of the up/down counter circuit 604.

As long as the count in the error counters 711 and 720 is less than three, the AND gates 709 and 718 are enabled and the error signals generated by the EXOR gates 706 and 708 are clocked through the AND gates 718 and 709 respectively by the CL2 clock signal and these error signals are counted by the error counters 720 and 711 respectively. If the count in the error counters 711 and 720 reaches three, the output signals from the AND gates 713 and 722 assume a high signal level inhibiting the AND gates 709 and 718 and the $\overline{ERR3B}$ and $\overline{ERR3A}$ signals assume low signal levels indicating that three or more differences exist between the received and locally generated addresses. The $\overline{ERR3A}$ and $\overline{ERR3B}$ signals are checked by the address accept circuit 614 of FIG. 5 at the end of each address portion of a message word to determine whether or not an address assigned to the particular receiver has been successively evaluated as will subsequently be described in greater detail.

The Q1 and Q2 output signals from the error counter 720 are also applied to the OR gate 724. If, during the initial sync acquisition portion of the message word, the $\overline{SYNC}$ signal is at a high signal level indicating that the up/down counter circuit 604 of FIG. 7 has not yet successively reached a count of three, the DDATA signal is applied through the AND gate 710, the OR gate 716 and the AND gate 718 to the error counter 720. The error counter 720 is reset immediately after receipt of the first sync acquisition or SA pattern and thereafter counts the number of ONE's in the 32 bit O's portion of the sync acquisition pattern. If one or more ONE's are counted in this portion of the sync acquisition signal, the ERR1 signal from the OR gate 724 assumes a high signal level and the count in the up/down counter 604 is decremented by a count of one as was previously described.

The DDATA signal is also applied through the AND gate 712 to the three stage counter 742. The three stage counter 742 counts the number of ONE's in the portions of the DDATA signal intermediate the sync acquisition and sync maintenance patterns SA and SB and, when a count of six is reached, the output signal from the AND gate 744 assumes a high signal level indicating that the first address portion of the DDATA signal has been received. Thereafter, the sync maintenance portions SB of the incoming data signal are checked against a locally generated sync maintenance signal assigned to the particular receiver (the last four bits of the ADS1 locally generated address signal) and the ERR1 signal thereafter indicates, by a high and low signal level respectively, the successful and unsuccessful decoding of the sync maintenance portion of the incoming SPDATA signal.

As was previously described in connection with FIG. 2 the incoming signal preferably comprises a binary data stream of the following pattern:

$S_A$ 32 0's $S_A$ 32 0's $S_A$ 32 0's $S_A$ $M_1$ $S_B$ $M_2$ $S_B$ $M_3$ - - - $S_B$ $M_{30}$

Where:

$S_A = 1101$ or any other suitable four bit pattern;

32 0's = 32 consecutive ZERO's;

$S_B$ = any four bit pattern; and, $M_1$, $M_2$, $M_3$ - - $M_{30}$ any 32 pattern except all zeros if the pattern is a 31, 16, 5 BCH code with even parity.

The significance of counting binary ONE's in the data stream after sync is achieved in this: Sync can be achieved at the end of the 2nd, 3rd or 4th $S_A$ pattern depending upon the data stream error rate. Counting of ONE's in the 32 bit intervals allows determination of the location of signals in the data stream. This is possible since the 32 0's pattern contains no ONE's and all M patterns ($M_1$, $M_2$, $M_3$ — $M_{32}$) contain at least 8 binary ONE's. This condition is guaranteed by the use of the BCH (Bose-Chaudhuri) code with even parity.

Note that the overall data stream consists of alternating 4 bit and 32 bit words and that the 4 bit words are always used for synchronization. The first three and only the first three 32 bit words are used for synchronization. The other thirty of the 32 bit words ($M_1$, $M_2$, etc.) are used for addresses. The technique is not, however, constrained to the use of these exact patterns or sequences.

6. Address Accept Circuit

Figure 11:
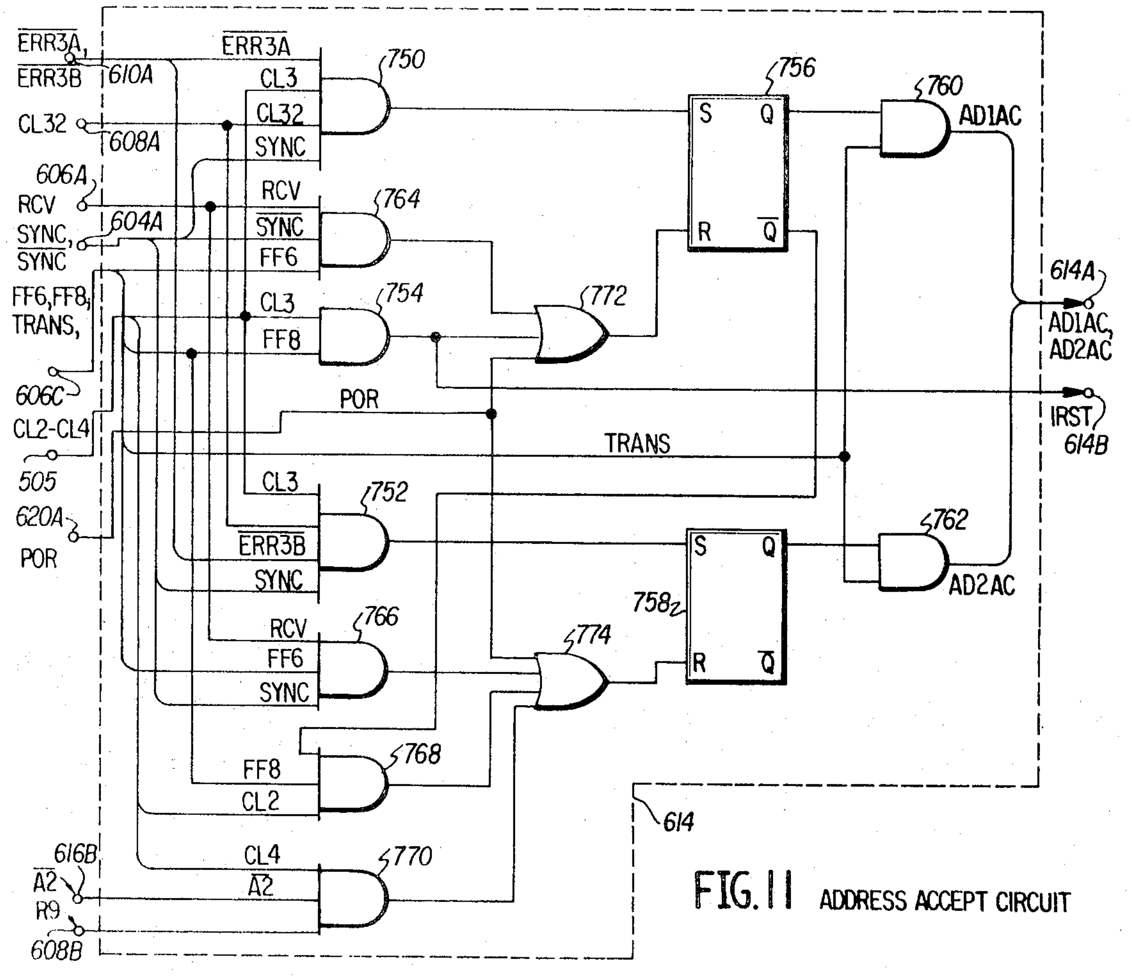
FIG. 11 is a more detailed functional block diagram of the address accept circuit of FIG. 5.

The address accept circuit 614 of the sync and decode logic circuit 506 of FIG. 5 is illustrated in greater detail in the functional block diagram of FIG. 11.

With reference now to FIG. 11, the ERR3A and ERR3B output signals from the output terminal 610A of the address evaluator 610 of FIGS. 5 and 10 may be applied, respectively, to one input terminal of a four input terminal AND gate 750 and to a four input terminal AND gate 752. The CL32 framing signal from the output terminal 608A of the matrix address generator 608 of FIGS. 5 and 8 may be applied to a second input terminal of the AND gate 750 and a second input terminal of the AND gate 752. The SYNC signal from the output terminal 604B of the up/down counter circuit 604 of FIGS. 5 and 7 may be applied to one input terminal of each of the AND gates 750 and 752 and the CL3 clock signal from the input terminal 505 of the sync and decode logic circuit 506 of FIG. 5 may be applied to a fourth input terminal of each of the AND gates 750 and 752 and to one input terminal of a two input terminal AND gate 754.

The output signal from the AND gate 750 may be applied to the set input terminal S of a suitable conventional bistable multivibrator or flip-flop 756 and the output signal from the AND gate 752 may be applied to the set input terminal S of a bistable multivibrator or flip-flop 758. The output signal from the true output terminal Q of the flip-flop 756 may be applied to one input terminal of a two input terminal AND gate 760 and the output signal from the true output terminal Q of the flip-flop 758 may be applied to one input terminal of a two input terminal AND gate 762. The "address No. 1 accept" or AD1AC output signal from the AND gate 760 and the "address No. 2 accept" or AD2AC output signal from the AND gate 762 may be applied to a collective output terminal 614A for application to the page indicator 602 of FIG. 5.

The RCV signal from the output terminal 606A of the receiver on/off logic circuit 606 of FIGS. 5 and 14 may be applied to one input terminal of a three input terminal AND gate 764 and a one input terminal of a three input terminal AND gate 766. The $\overline{SYNC}$ signal from the collective output terminal 604A of the up/down counter circuit 604 of FIGS. 5 and 7 may be applied to another input terminal each of the AND gates 764 and 766. The FF6 signal from the collective output terminal 606C of the receiver on/off logic circuit 606 of FIG. 5 may be applied to the third input terminal of each of the AND gates 764 and 766.

With continued reference to FIG. 11, the FF8 signal may be applied via the collective output terminal 606C of the receiver on/off logic circuit 606 of FIG. 5 to the other input terminal of the AND gate 754 and to one input terminal of a three input terminal AND gate 768. The $\overline{A2}$ output signal from the address matrix circuit 616 of FIG. 23 may be applied via the input terminal 616B to one input terminal of a three input terminal AND gate 770 and the CL2 and CL4 clock signals may be applied from the timing recover circuit of FIG. 4 via the collective input terminal 505 to the AND gates 768 and 770 respective. The R9 signal from the output terminal 608B of the matrix address generator 608 of FIG. 8 may be applied to the third input terminal of the AND gate 770.

The output signal from the AND gate 764 may be applied to one input terminal of a three input terminal OR gate 772 and the output signal from the AND gate 754 may be applied to the second input terminal of the OR gate 772 and to an output terminal 614B of the address accept circuit 614 as the "indicator reset" or IRST output signal. The output signal from the OR gate 772 may be applied to the reset input terminal R of the flip-flop 756 and the output signal from the false output terminal $\overline{Q}$ of the flip-flop 756 may be applied to the third input terminal of the AND gate 768.

The output signals from the AND gates 766, 768 and 770 may each be applied to one input terminal of a four input terminal OR gate 774 and the output signal from the OR gate 774 may be applied to the reset input terminal R of the flip-flop 758. The POR output signal from the output terminal 620A of the power on reset circuit 620 of FIG. 5 may be applied to one input terminal of each of the OR gates 772 and 774 and the "address transfer" or TRANS signal may be applied from the receiver on/off logic circuit 606 of FIG. 5 via the terminal 606C to the other input terminal of each of the AND gates 760 and 762.

In operation and with continued reference to FIG. 11, the address error signals $\overline{ERR3A}$ and $\overline{ERR3B}$ from the address evaluator 610 of FIG. 10 are inspected by the AND gates 750 and 752 at the end of each address portion of the incoming data signal DDATA, i.e., when the framing signal CL32 assumes a high signal level and when the up/down counter circuit 604 has reached the count of three indicating an "in sync" condition. If either of the address error signals $\overline{ERR3A}$ or $\overline{ERR3B}$ is at a high signal level indicating that less than three errors existed between the locally generated and received address signal, the output signal from the corresponding one of the AND gates 750 and 752 assumes a high signal level for the duration of the CL3 clock pulse thereby setting the associated flip-flop 756 or 758.

The address transfer or TRANS signal from the receiver on/off logic circuit 606 of FIG. 5 assumes a high signal level at the end of each time slot in which the incoming data signal is evaluated. When the TRANS signal assumes a high signal level, and if one of the flip-flops 756 or 758 has been set, the corresponding one of the AD1AC or AD2AC output signals from the AND gates 760 and 762 assumes a high signal level indicating that one of the addresses assigned to the receiver was successfully decoded during the time slot. This high signal level signal is applied to the page indicator 602 of FIG. 5 to initiate an audible alarm indicating that one or the other of the addresses assigned to the receiver has been received and successfully evaluated.

The "power on reset" or POR signal from the power on reset circuit 620 of FIG. 5 initially rests the flip-flops 756 and 758 when the receiver is energized. Thereafter, if the bit error rate of the incoming data signal SPDATA becomes excessive after the first address portion of the data signal has been received, i.e., if the $\overline{SYNC}$ signal assumes a high signal level, the output signals from the AND gates 764 and 766 assume high signal levels and reset the flip-flops 756 and 758, respectively, through the OR gates 772 and 774. Thus the indication of a page by the page indicator 602 of FIG. 5 is prevented when the bit error rate of the incoming data signal exceeds a predetermined level at any time during the decoding of address signals in a particular time slot.

The FF8 and CL3 signals applied respectively from the receiver on/off logic circuit 606 of FIG. 5 and the timing recovery circuit of FIG. 4 to the AND gates 754 and 768 ordinarily reset both of the flip-flips 756 and 758 at the beginning of each new time slot or minor data frame. However, if both of the addresses assigned to a particular receiver are received and successfully evaluated during the same time slot, the output signal from the false output terminal of the flip-flop 756 inhibits the AND gate 768 preventing the flip-flop 758 from being reset until both the addresses have been accepted and have initiated separate page indications as will hereinafter be described in greater detail in connection with FIG. 12.

7. Page Indicator

Figure 12:
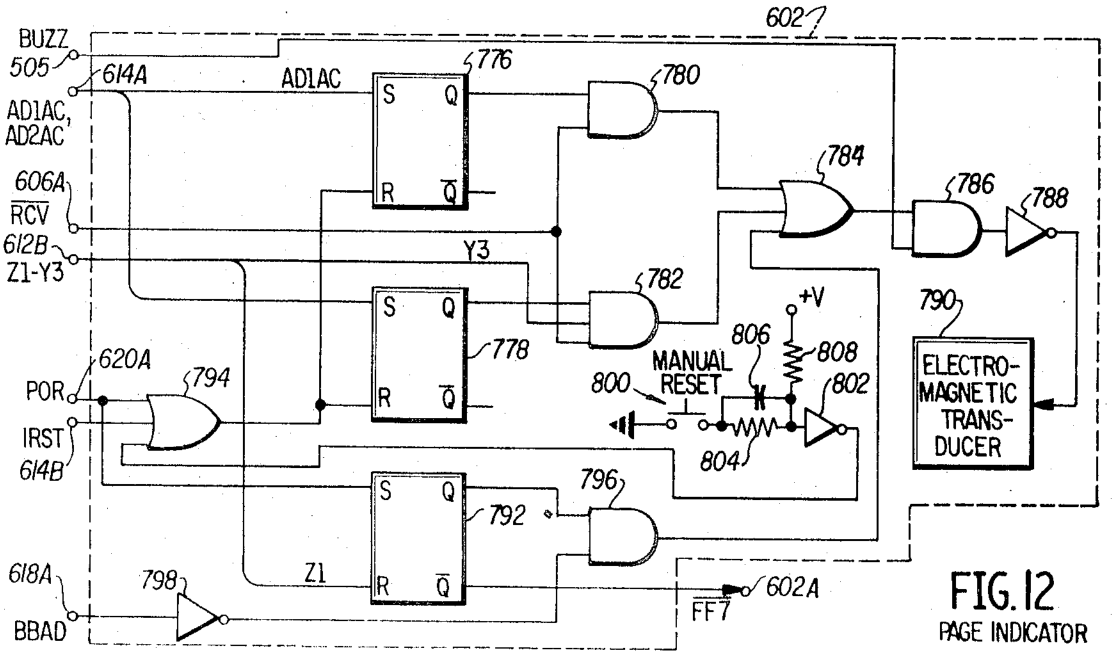
FIG. 12 is a more detailed functional block diagram of the page indicator of FIG. 5.

The page indicator 602 of the sync and decode logic circuit 506 of FIG. 5 is illustrated in greater detail in the functional block diagram of FIG. 12. With reference now to FIG. 12, the two "address accept" or AD1AC and AD2AC signals from the output terminal 614A of the address accept circuit 614 of FIGS. 5 and 11 may be applied, respectively, to the set input terminals S of the bistable multivibrators or flip-flops 776 and 778. The output signal from the true output terminal Q of the flip-flop 776 may be applied to one input terminal of a two input terminal AND gate 780 and the output signal from the true output terminal Q of the flip-flop 778 may be applied to one input terminal of a three input terminal AND gate 782. The output signals from the AND gates 780 and 782 may be applied to two input terminals of a three input terminal OR gate 784 and the output signal from the OR gate 784 may be applied to one input terminal of a two input terminal AND gate 786. The output signal from the AND gate 786 may be applied through an inverter 788 to a suitable conventional electromagnetic transducer 790.

The $\overline{RCV}$ signal from the output terminal 606A of the receiver on/off logic circuit 606 of FIG. 5 may be applied to the second input terminal of the AND gate 780 and to an input terminal of the AND gate 782. A Y3 timing signal from the output terminal 612B of the timing signal generator 612 of FIGS. 5 and 13 may be applied to an input terminal of the AND gate 782 and the Z1 timing signal from the collective terminal 612B of the timing signal generator 612 may be applied to the reset input terminal R of a bistable multivibrator or flip-flop 792.

The "power on reset" or POR signal from the output terminal 620A of the power on reset circuit 620 of FIG. 5 may be applied to one input terminal of a three input terminal OR gate 794 and to the set input terminal S of the flip-flop 792. The "indicator reset" or IRST signal from the output terminal 614B of the address accept circuit 614 of FIG. 11 may be applied to a second input terminal of the OR gate 794 and the output signal from the OR gate 794 may be applied to the reset input terminals R of the flip-flops 776 and 778.

The output signal from the true output terminal Q of the flip-flop 792 may be applied to one input terminal of a two input terminal AND gate 796 and the output signal from the false output terminal $\overline{Q}$ of the flip-flop 792 may be applied via an output terminal 602A of the page indicator to the receiver on/off logic circuit 606 of FIG. 5 as the $\overline{FF7}$ signal. The "battery bad" or BBAD output signal from the output terminal 618A of the battery test circuit 618 of FIG. 5 may be applied through an inverter 798 to the other input terminal of the AND gate 796 and the output signal from the AND gate 796 may be applied to the third input terminal of the OR gate 784.

With continued reference to FIG. 12, a manual reset switch 800 may be connnected between ground and the input terminal of a conventional inverter 802 through a resistor 804 in parallel with a capacitor 806. The input terminal of the inverter 802 may also be connected to a source of positive d.c. potential through a resistor 808. The output signal from the inverter 802 may be applied to the third input terminal of the OR gate 794.

In operation, the AD1AC and AD2Ac signals are transferred to the page indicator 602 at the end of a successfully received time slot from the address accept circuit 614 in FIG. 11 and are stored by the flip-flops 776 and 778. If both addresses assigned to a receiver are received during the same time slot, the address accept signals AD1AC and AD2AC are transferred at different times as was previously described to ensure an indication to the paged subscriber of the receipt of both address signals by the portable receiver.

When the AD1AC signal sets the flip-flop 776, when the AND gate 780 is enabled, and when the receiver is turned off at the end of the time slot, i.e, the $\overline{RCV}$ signal assumes a high signal level, the output signal from the AND gate 780 assumes a high signal level enabling the AND gate 786 through the OR gate 784 and allowing the steady tone BUZZ signal from the timing recovery circuit of FIG. 4 to be applied through the inverter 788 to the electromagnetic transducer 790.

When the flip-flop 778 is set by the AD2AC signal, the AND gate 782 is enabled. When the receiver is turned off at the end of the time slot, the Y3 signal is gated through the AND gate 782 providing a series of pulses at the output terminal thereof at a repetition rate of approximately 4.16 hertz. This series of pulses at the output terminal of the AND gate 782 is applied to the AND gate 786 through the OR gate 784 and gates a chopped BUZZ signal through the AND gate 786 and the inverter 788 to the transducer 790. Thus, a steady audible tone from the transducer 790 indicates that the first address assigned to the receiver has been received, and a chopped or modulated tone indicates that the second address has been received.

In addition, when receiver power is initially turned on, the flip-flop 792 is set by the POR signal from the power on reset circuit 620 of FIG. 19 to be reset approximately 0.96 seconds later by the Z1 signal from the timing signal generator 612 of FIG. 5. During this time, the battery is checked and if good, i.e., if the BBAD signal is at a low signal level, the output signal from the AND gate 796 assumes a high signal level gating the BUZZ signal through the AND gate 786 to the transducer 790 for approximately 1 second.

When an address has been received and successfully decoded and a tone is provided by the transducer 790, the subscriber may manually reset the flip-flops 776 and 778 to deenergize the transducer 790 by depressing the manual reset switch 800 and momentarily grounding the input terminal of the inverter 802. In this manner, a positive pulse is generated at the output terminal of the inverter 802 and is applied through the OR gate 794 to the reset input terminals of both the flip-flops 776 and 778.

8. Timing Signal Generator

The timing signal generator 612 of the sync and decode logic circuit 506 of FIG. 5 is illustrated in greater detail in the functional block diagram of FIG. 13.

Referring now to FIG. 13, the CL36 framing signal from terminal 608A of the matrix address generator 608 of FIG. 8 which occurs at the beginning of each sync acquisition and sync maintenance pattern when the receiver is properly synchronized may be applied to the clock input terminal C of a suitable conventional six stage binary counter 810. The Y1–Y5 output signals from the true output terminals of the first through fifth stages, respectively, of the counter 810 may be provided at a collective output terminal 612A of the timing signal generator 612 for application to the receiver on/off logic circuit 606 of FIG. 5. The Y3 signal from the true output terminal of the third stage of the binary counter 810 may be provided at the collective output terminal 612B for application to the page indicator 602 of FIG. 12.

The Y5 output signal from the true output terminal from the fifth stage of the binary counter 810 may be applied through an inverter 811 to the clock input terminal C of a suitable conventional divide by eight counter 812. The Z1, Z2, and Z3 output signals from the true output terminals of the first through third stages of the counter 812 may be applied to three input terminals of a four input terminal AND gate 814. The output signal S6.7 from the AND gate 814 may be applied via the collective output terminal 612A to the receiver on/off logic circuit 606 of FIG. 5 and the Z1 signal from the first stage of the counter 812 may be provided at the collective output terminal 612B for application to the page indicator 602 of FIG. 26.

The POR signal from the output terminal 620A of the power on reset circuit 620 of FIG. 5 may be applied to one input terminal of a three input terminal OR gate 816 and the FF21 and ADREC signals from the output terminal 606B of the receiver on/off logic circuit 606 of FIG. 5 may be applied to the other two input terminals of the OR gate 816. The output signal from the OR gate 816 may be applied to the reset input terminals R of each of the counters 810 and 812. The CL2 clock signal from the collective input terminal 505 of the sync and decode logic circuit 506 of FIG. 5 may be applied to the fourth input terminal of the AND gate 814.

In operation and with continued reference to FIG. 13, both the counter 810 and the counter 812 are reset initially by the "power on reset" signal POR from the power on reset circuit 620 of FIG. 5, by the "address received" signal ADREC from the receiver on/off logic circuit of FIG. 5 and by the "timing reset" signal FF21 from the receiver on/off logic circuit of FIG. 5. The counter 810 is thus reset after the sync acquisition portion of any incoming data signal has been received and is thereafter clocked by the CL36 framing signal from the timing recovery circuit of FIG. 4 at the beginning of each sync acquisition and sync maintenance signal SA and SB. The counter 810, in effect, thus counts the number of address signals received.

The Y3 signal from the counter 810 provides the chopping signal for the second address tone in the page indicator 602 of FIG. 12 and the Y1–Y5 signals are applied to the receiver on/off logic circuit 606 of FIG. 14 to provide the 29 DEC and 30 DEC signals which indicate that the 29th and 30th addresses, respectively, have been received as will hereinafter be described in greater detail with FIG. 14.

The $\overline{Y5}$ signal from the counter 810 is utilized to clock the counter 812. The output signals from the divide-by-eight counter are decoded by the AND gate 814 to provide the 6.72 second "receiver off" pulse S6.7 which is utilized to turn the receiver off after the DDATA signal in a selected time slot has been successfully decoded. The Z1 signal from the divide-by-eight counter 812 also provides the 0.96 second gate for the battery check tone circuit in the page indicator 602 as was previously described in connection with FIG. 12.

9. Receiver On/Off Logic Circuit

The receiver on/off logic circuit 606 of the sync and decode logic circuit 506 of FIG. 5 is illustrated in greater detail in FIG. 14. Referring now to FIG. 14, the G signal indicating that a first address has been received is applied from the output terminal 610C of the address evaluator 610 of FIG. 10 to the clock input terminal C of a bistable multivibrator or flip-flop 818. The set steering terminal D of the flip-flop 818 is connected to a positive d.c. potential and the CL3 signal from the input terminal 505 of the sync and decode logic circuit may be applied to the reset input terminal R of the flip-flop 818.

The "address received" or ADREC output signal from the true output terminal Q of the flip-flop 818 may be applied to the set input terminal S of a bistable multivibrator or flip-flop 820 and to the collective output terminal 606B of the receiver on/off logic circuit 606 for application to the timing signal generator 612 of FIG. 13. The FF6 output signal from the true output terminal of the flip-flop 820 indicates that the receiver is in sync and that a first address has been received. This FF6 signal may be applied to one input terminal of a three input terminal AND gate 822 and via the collective output terminal 606C of the receiver on/off logic circuit 606 to the address accept circuit 614 of FIG. 11. The "transfer" or TRANS output signal from the AND gate 822 may be applied to the set input terminal S of a bistable mulltivibrator or flip-flop 824 and via the colllective output terminal 606C to the address accept circuit 614 of FIG. 11.

The output signal from the true output terminal Q of the flip-flop 824 may be applied to one input terminal of a three input terminal AND gate 826 and the output signal from the AND gate 826 may be applied to the set input terminal S of a bistable multivibrator or flip flop 828. The "receiver on" or RCV output signal from the false output terminal $\overline{Q}$ of the flip flop 828 may be provided at the collective output terminal 606A.

The RCV signal may also be applied to one input terminal of a two input terminal AND gate 830 and the output signal from the AND gate 830 may be applied to the clock input terminal C of a bistable multivibrator or flip-flop 832 and through an inverter 834 to both the clock input terminal C of a bistable multivibrator or flip flop 836 and to the collective output terminal 606A as the $\overline{RCV}$ or "receiver off" output signal.

The set steering input terminals D of the flip-flops 832 and 836 may be connected to a positive d.c. potential and the set input terminals S of the flip-flops 832 and 836 may be grounded. The output signals FF8 and FF21 from the true output terminals Q of the flip-flops 832 and 836, respectively, may be applied via the respective collective output terminals 606C and 606B to the address accept circuit 614 of FIG. 11 and the timing signal generator 612 of FIG. 13. The CL4 clock signal from the collective output terminal 505 of the timing recovery circuit 504 of FIG. 3 may be applied to the reset input terminals R of each of the flip-flops 832 and 836.

The Y1 timing signal from the output terminal 612A of the timing signal generator 612 of FIG. 13 may be applied to one input terminal of a five input terminal AND gate 838 and through an inverter 840 to one input terminal of a five input terminal AND gate 842. The Y2 timing signal from the collective terminal 612A of the timing signal generator 612 may be applied to a second input terminal of an AND gate 842 and through an inverter 844 to a second input terminal of the AND gate 838. The Y3–Y5 signals also from the collective terminal 612A of the timing signal generator 612 may be applied to the remaining input terminals of the AND gates 838 and 842.

The "decoded 29 addresses" or 29DEC output signal from the AND gate 838 may be applied to an input terminal of the AND gate 822 and the "decoded 30 addresses" or 30DEC output signal from the AND gate 842 may be applied to an input terminal of the AND gate 826. The CL2 clock signal from the collective output terminal 505 of the timing recovery circuit of FIG. 4 may be applied to an input terminal of each of the AND gates 822 and 826.

The CL1 clock signal also from the collective input terminal 505 may be applied to one input terminal of a two input terminal AND gate 846 and the output signal from the AND gate 846 may be applied to the reset input terminal R of the flip-flop 820. The $\overline{SYNC}$ signal from the output terminal 604B of the up/down counter circuit 604 of FIG. 7 may be applied to the other input terminal of the AND gate 846.

The POR signal from the output terminal 620A of the power on reset circuit 620 of FIG. 5 may be applied to one input terminal of a two input terminal OR gate 848 and the output signal from the OR gate 848 may be applied to the reset input terminal R of each of the flip-flops 828 and 824. The $\overline{FF7}$ signal, a 0.96 second negative going pulse during the time the battery check is being made, may be applied from the output terminal 602A of the page indicator 602 of FIG. 12 to the second input terminal of the AND gate 830.

In operation and with continued reference to FIG. 28, the G signal from the address evaluator 610 of FIG. 10 sets the flip-flop 818 when a first address signal has been received. The "address received" or ADREC signal sets the flip-flop 820 and the FF6 signal from the flip-flop 820 enables the AND gate 822 for the remainder of the time slot unless the flip-flop 820 is reset by the loss of sync as indicated by the $\overline{SYNC}$ signal.

When the AND gate 838 decodes a count of 29 indicating that all of the addresses have been received, the transfer signal TRANS assumes a high signal level and sets the flip-flop 824 which in turn enables the AND gate 826. When the AND gate 842 decodes a count of 30 indicating that any successfully decoded address signals have been transferred to the page indicator circuit 602 as was previously described, the output signal from the AND gate 826 assumes a high signal level setting the flip-flop 828 to provide a high signal level "receiver off" signal $\overline{RCV}$ through the AND gate 830 and the inverter 834.

The $\overline{RCV}$ signal remains at the high signal level until the S6.7 signal from the timing signal generator 612 of FIG. 27 resets the flip-flop 828 approximately 6.72 seconds later. The RCV signal is, of course, at a low signal level during this 6.72 second interval and may be utilized to inhibit the application of power to the receiver circuit 502 of FIG. 3 in any suitable conventional manner during this 6.72 second interval.

The $\overline{RCV}$ signal sets the flip-flop 836 when the receiver is turned off, i.e., when the $\overline{RCV}$ signal assumes a high signal level. Approximately 6.72 seconds later, the RCV signal sets the flip-flop 832. Shortly after being set, the flip-flops 836 and 832 are reset by the CL4 clock signal and, thus, a short duration pulse FF21 is provided to the timing signal generator 612 of FIG. 13 as a reset signal when the receiver is first turned off. A short duration pulse the (the FF8 signal) is also provided approximately 6.72 seconds later to the address accept circuit 614 of FIG. 11 to generate the "page indicator reset" signal IRST. The $\overline{FF7}$ signal delays the $\overline{RCV}$ signal until after the 0.96 second battery check period, thus delaying the energization of the receiver. This delay prevents modulation of the VCO in the timing recovery circuit 504 of FIG. 4 by either signal during the battery check.

ADVANTAGES AND SCOPE OF THE INVENTION

The method and apparatus of the present invention as embodied in a paging system is readily understood from the above detailed description. In such an embodiment, the present invention avoids the problem of delay equalization associated with simultaneous transmission of the paging signal by plural transmitters in a paging area through the sequencing of the transmitters to broadcast in mutually exclusive time slots.

The compounding of the delay problems in systems employing large numbers of transmitters is also avoided through the spacing of transmitters operating in the same time slot such as to avoid any probability of propagation pattern overlap. Thus the number of transmitters in a paging area can be readily increased to ensure omission of receiver blind spots without mutual interference between the transmitters. Frequency offset problems are also avoided since each of the transmitters may operate at the same carrier frequency without interference.

Through the utilization of modular units, the paging system described may be readily expanded as the needs thereof change. The system is moreover operable with end-to-end dialing and with NNX Codes. The need for and expense of adapters to interface the paging system with the existing commercially installed telephone equipment and with existing paging systems is also avoided and fail safe operation is a reality.

By the use of standard minicomputers, the system described is operative for control of a plurality of subscriber paging services within a single paging area, for the control of paging systems in different paging areas, and for compatability with existing tone systems.

Through digital techniques, analog squelch problems have been obviated and the physical size of the equipment has been markedly reduced with the portable receiver, for example, reduced to about the size of a pack of cigarettes. The capacity for the system over prior known systems is vastly increased with a 60,000 address capacity in a single channel at a call rate of 3.75 per second and a bit rate of 1,200 bits per second in the voice bandwidth. Single or dual addresses may be assigned to each receiver as desired.

Through the use of a highly redundant Bose-Chaudhuri code and the unique address evaluation technique, the probability of decode with an 8 bit separation distance between immediately adjacent addresses and 2 or less bit errors for acceptance is 0.996 against the probability of accepting another address of $3 \times 10^{-11}$ for a bit error rate of 0.01. For a bit error rate of 0.001, however, the ratio of acceptance to erroneous acceptance probability is 0.999995 to $3 \times 10^{-17}$.

The probability of obtaining sync within a full second of data, i.e., one major data frame, with a bit error rate of 0.01 is 0.942 as against a false sync probability of $10^{-26}$. At a bit error rate of 0.001, the sync/false sync probability figures are 0.9995 to $10^{-32}$.

The above figures illustrate the effectiveness and reliability of the method and system of the present invention when embodied as a subscriber paging service. The present invention, however, has numerous other applications in data transmission and control of remote apparatus. The present invention may thus be embodied in other specific forms without departing from the spirit or essential characteristics thereof. The presently disclosed exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A radio receiver for use in a discrete address communication system comprising:

means for receiving a modulated carrier signal, the modulation of said carrier representing a digital signal having a predetermined bit rate and including an address portion and a synchronizing portion;

discriminator means for detecting the modulation of said carrier signal;

means for generating a digital clock signal synchronized in phase and bit rate with said digital signal responsively to the detected modulation;

means for generating an enabling signal responsively to the synchronizing portion of said digital signal;

means for generating a digital address signal unique to the receiver;

means for detecting differences in binary signal levels between corresponding bits of said generated address signal and the address portion of said digital signal responsively to said clock signal and for generating an error signal in response to each detected difference;

means for counting the number of error signals generated responsively to said enabling signal; and, indicator means responsive to said counting means for providing an indication related to the number of error signals counted.

2. The system of claim 1 wherein said modulation is frequency.

3. The receiver of claim 2 wherein said digital clock signal generating means includes:

oscillator means for generating a periodic signal having a repetition rate approximating said predetermined bit rate;

means for comparing the phase and repetition rate of said periodic signal with the phase and bit rate of said detected frequency modulation; and, means for synchronizing said periodic signal in phase and repetition rate with said detected frequency modulation responsively to said comparing means.

4. A radio receiver for decoding a digital signal repetitively transmitted at a predetermined bit rate during successive time slots, said receiver comprising:

means for receiving a transmitted digital signal;

means responsive to the received digital signal for determining a bit error rate of the received digital signal in excess of a predetermined value and for selecting one of said time slots; and, means for evaluating the digital signal received during said selected one of said time slots.

5. The receiver of claim 4 wherein said digital signal includes an address portion and a synchronizing portion, said excess bit error rate determining means being responsive to said synchronizing portion.

6. The receiver of claim 5 wherein said excess bit error rate determining means includes:

means for detecting the synchronizing portion of said digital signal;

means for generating an enabling signal responsively to the detection of said synchronizing portion of said digital signal; and, means for selecting one of said time slots responsively to said enabling signal.

7. The receiver of claim 4 including means responsive to said receiving means for generating a clock signal synchronized in phase and bit rate with said received digital signal.

8. The receiver of claim 7 wherein said digital signal includes an address portion and wherein said signal evaluating means includes:

means for locally generating an address signal assigned to said receiver; and, means for detecting and counting each difference in signal level between each bit of said address portion of said received digital signal and each corresponding bit of said locally generated address signal responsively to said clock signal and said excess bit error rate determining means.

9. The system of claim 7 wherein said digital signal includes an address portion and wherein said signal evaluating means includes means for locally generating a plurality of address signals assigned to said receiver; and, means for detecting and counting each difference in signal level between each bit of said address portion of said received digital signal and each corresponding bit of each of said locally generated address signals responsively to said clock signal and said excess bit error rate determining means.

10. The system of claim 9 wherein said detecting and counting means includes means for simultaneously detecting each signal level difference between each bit of the address portion of said received digital signal and each corresponding bit of each of said plurality of locally generated address signals.

11. The system of claim 4 including means for generating a plurality of predetermined digital signals, the digital signal received during the selected time slot being evaluated in relation to said plurality of predetermined digital signals.

12. A radio receiver for a paging system wherein a paging signal including a digital address portion and a digital synchronizing portion is transmitted at a predetermined bit rate throughout a paging area, the receiver comprising:

means for receiving the paging signal;

means for generating a clock signal synchronized in phase and bit rate with the received paging signal;

means for generating a digital address signal unique to the radio receiver;

means responsive to said clock signal for detecting differences in binary signal levels between each bit position of said generating digital address signal and each corresponding bit position of the address portion of the received paging signal, and, means for counting the number of detected differences.

13. A method of evaluating a discrete address signal comprising the steps of:

a. receiving a carrier signal modulated by a digital signal having a predetermined bit rate and including an address portion and a synchronizing portion;

b. detecting the modulation of the received signal;

c. generating a digital clock signal synchronized in phase and bit rate with the digital signal responsively to detected modulation;

d. generating an enabling signal responsively to the synchronizing portion of the detected digital signal;

e. generating a digital address signal unique to the receiver;

f. detecting differences in binary signal levels between corresponding bits of the generated address signal and the address portion of the detected digital signal responsively to the generated clock signal, and generating an error signal in response to each detected difference; and, g. counting the number of error signals generated responsively to the enabling signal.

14. The method of claim 13 wherein the digital clock signal is generated by the steps of:

generating a periodic signal having a repetition rate approximating the predetermined bit rate;

comparing the phase and repetition rate of the generated periodic signal with the phase and bit rate of the detected modulation to generate a comparison error signal; and, synchronizing the generated periodic signal in phase and repetition rate with the detected modulation responsively to the generated comparison error signal.

15. A method of decoding a digital signal repetitively transmitted at a predetermined bit rate during successive time slots comprising the steps of:

a. receiving a transmitted digital signal;

b. generating a distinctive signal responsively to the bit error rate of the received digital signal exceeding a predetermined value in at least one of the time slots;

c. selecting one of said time slots responsively to said distinctive signal; and, d. evaluating the digital signal received during said time slot selected responsively to the distinctive signal.

16. The method of claim 15 wherein the digital signal includes an address portion and a synchronizing portion; and, including the step of determining that the bit error rate exceeds said value in response to the synchronizing portion of the digital signal.

17. The method of claim 16 including the steps of:

generating a plurality of address signals; and, detecting and counting each difference in signal level between each bit of the address portion of the received digital signal and each corresponding bit of each of the generated address signals.

18. A method for evaluating a paging signal including a digital address portion and a digital synchronizing portion transmitted at a predetermined bit rate throughout a paging area comprising the steps of:

a. receiving the paging signal at a portable receiver b. generating a clock signal synchronized in phase and bit rate with the received paging signal;

c. generating at the receiver a digital address signal unique to the receiver;

d. detecting responsively to the clock signal differences in binary signal levels between each bit position of the generating digital address signal and each corresponding bit position of the address portion of the received paging signal; and, e. counting the number of detected differences.

19. The method of claim 18 including the steps of generating a second digital address signal unique to the receiver; and, simultaneously detecting and counting each difference in signal level between each bit of the address portion of the received digital signal and each corresponding bit of each of the generated digital address signals.

20. In a digital paging system wherein a digital paging signal, including a plurality of plural bit patterns at predetermined positions in the digital paging signal and a plurality of plural bit subscriber addresses, is transmitted at a predetermined bit rate during each of a plurality of successive time slots, a digital paging receiver comprising:

means for receiving the transmitted digital paging signal;

means for evaluating each of the received plurality of plural bit patterns at the predetermined positions against a predetermined plural bit pattern assigned to all receivers of the digital paging system; and, means for selecting one of the plurality of time slots for evaluation of the addresses transmitted in that time slot in response to the detection by said evaluating means of a predetermined relationship between the received plurality of predetermined plural bit patterns and the predetermined plural bit pattern assigned to the receiver.

21. The receiver of claim 20 wherein said predetermined plural bit pattern designates a paging area served by said paging system.

22. The receiver of claim 20 including means responsive to said selecting means for deenergizing at least a portion of the digital paging receiver at the end of the selected one of the plurality of time slots.

23. The receiver of claim 22 wherein said predetermined plural bit pattern designates a paging area served by said paging system.

24. In a digital paging system wherein a digital paging signal, including a plurality of predetermined plural bit patterns at predetermined positions in the digital paging signal and a plurality of plural bit subscriber addresses, is transmitted at a predetermined bit rate during each of a plurality of successive time slots, a digital paging receiver comprising:
- means for receiving the transmitted digital paging signal;
- means for detecting the presence and absence of each of the plurality of predetermined plural bit patterns at the predetermined positions in the received digital paging signal;
- an up/down counter providing an output signal;
- means for incrementing and decrementing said counter to increase and decrease said counter output signal in response to the detected presence and absence, respectively, of the plurality of predetermined plural bit patterns; and,
- means for evaluating each of the plurality of subscriber addresses in response to said counter output signal.

25. In a digital paging system wherein a digital paging signal, including a plural bit synchronizing portion and a plurality of plural bit subscriber address portions, is transmitted at a predetermined bit rate during each of a plurality of successive time slots, a portable digital paging receiver adapted to be carried by a subscriber comprising:
- means for receiving the transmitted digital paging signal including the synchronizing portion and the subscriber address portions;
- means for selecting one of the time slots for evaluation of the subscriber address portions of the received digital paging signal in response to the synchronizing portion of the received digital paging signal;
- means for generating a plural bit receiver address signal assigned to the subscriber;
- means for detecting differences in signal levels between each bit of the plural bit receiver address signal and each corresponding bit of each of the received subscriber address portions of the digital paging signal;
- means for counting each detected difference; and,
- means for alerting the subscriber in response to the counted differences.

26. The receiver of claim 25 wherein said alerting means comprises means for alerting the subscriber in response to the counted differences for any one of the received subscriber address portions being less than a predetermined value at the end of the selected time slot.

27. The receiver of claim 26 wherein said predetermined value of said counted differences is three.

28. The receiver of claim 25 wherein said differences detecting means is operable to detect signal level differences at the predetermined bit rate of the digital paging signal.

29. The receiver of claim 28 wherein said alerting means comprises means for alerting the subscriber in response to the counted differences for any one of the received subscriber address portions being less than a predetermined value at the end of the selected time slots.

30. A radio receiver for decoding a digital signal including a plurality of predetermined plural bit synchronizing patterns at predetermined spaced positions and a plurality of plural bit subscriber address signals, the digital signal being repetitively transmitted at a predetermined bit rate from different locations throughout a paging area during a major data frame comprising a plurality of successive time slots, said receiver comprising:
- means for receiving the transmitted digital signal;
- means for detecting each of the plurality of predetermined plural bit synchronizing patterns in the received digital signal;
- means responsive to said detecting means for generating an enabling signal representative of the number of plural bit synchronizing patterns detected during a time slot relative to the number of plural bit synchronizing patterns transmitted during that time slot; and,
- means for selecting a time slot for evaluation of each of the plural bit subscriber address signals in the transmitted digital signal in response to said enabling signal, said selecting means being operable to deenergize at least a portion of the receiver during at least some of the unselected time slots in a major data frame.

31. The radio receiver of claim 30 including means for evaluating each of the subscriber address signals in the received digital signal against a unique address assigned to the receiver and for indicating correspondence within a predetermined tolerance between the assigned address and a received subscriber address signal during the time slot selected in response to said enabling signal.

32. The radio receiver of claim 31 wherein said evaluating and indicating means includes:
- means for detecting and counting each difference in binary signal level between each bit of the assigned address and each corresponding bit of each of the plurality of subscriber adddress signals in the received digital signal; and,
- means for alerting a subscriber in response to a counted number of detected differences below a predetermined value greater than one.

33. A radio receiver for use in a discrete address communication system comprising:
- means for receiving a modulated carrier signal, the modulation of said carrier representing a digital signal having a predetermined bit rate and including an address portion and a synchronizing portion, said synchronizing portion including a predetermined plural bit signal spaced at predetermined positions in said digital signal;
- discriminator means for detecting the modulation of said carrier signal;
- means for generating a digital clock signal synchronized in phase and bit rate with said digital signal responsively to said detected modulation;
- means for generating an enabling signal responsively to the synchronizing portion of said digital signal, said enabling signal generating means including:
  - means for detecting said plural bit signal in said digital signal; means for generating a digital count signal related in value to the number of said plural bit signals detected by said detecting means; and, means for generating said enabling signal in response to said digital count signal exceeding a predetermined value;

means for generating a digital address signal unique to the receiver;

means for detecting differences in binary signal levels between corresponding bits of said generated address signal and the address portion of said digital signal responsively to said clock signal and for generating an error signal in response to each detected difference;

means for counting the number of error signals generated responsively to said enabling signal; and, indicator means responsive to said counting means for providing an indication related to the number of error signals counted.

34. A radio receiver for decoding a digital signal, including a predetermined plural bit digital signal at spaced positions therein, repetitively transmitted at a predetermined bit rate during successive time slots, said receiver comprising:

means for receiving the transmitted digital signal;

means for determining a bit error rate of the received digital signal in excess of a predetermined value in at least one of said time slots comprising:

means for detecting said predetermined plural bit digital signal at spaced positions in the received digital signal;

a counter responsive to said detecting means for providing an output signal related to the number of the plural bit digital signal detected; and, means for generating an enabling signal and selecting one of said time slots responsively to said counter output signal; and, means responsive to said enabling signal for evaluating the digital signal received during said selected time slot.

35. A radio receiver for decoding a digital signal including an address portion and a synchronizing portion repetitively transmitted at a predetermined bit rate during successive time slots, said receiver comprising:

means for receiving the transmitted digital signal;

means responsive to said synchronizing portion of the received digital signal for determining a bit error rate of the received digital signal in excess of a predetermined value in at least one of said time slots; and, means for evaluating the address portion of the digital signal received during a time slot selected responsively to said excess bit error rate determining means, said excess bit error rate determining means including:

means for detecting the synchronizing portion of said digital signal;

an up/down counter providing an output signal;

means responsive to said detecting means for incrementing and decrementing said up/down counter to vary said counter output signal in response to the detected synchronizing portion of said digital signal;

means for generating an enabling signal in response to said counter output signal; and, means for selecting one of said time slots responsively to said enabling signal.

36. A radio receiver for decoding a digital signal including an address portion and a synchronizing portion repetitively transmitted at a predetermined bit rate during successive time slots, said receiver comprising:

means for receiving the transmitted digital signal;

means responsive to the synchronizing portion of said digital signal for determining a bit error rate of the received digital signal in excess of a predetermined value in at least one of said time slots; and, means for evaluating the address portion of the digital signal received during a time slot selected responsively to said excess bit error rate determining means, said excess bit error rate determining means including:

means for detecting a synchronizing portion of said digital signal;

means for generating an enabling signal responsively to the detection of said synchronizing portion of said digital signal; and, means for selecting one of said time slots responsively to said enabling signal;

said receiver further including means responsive to said enabling signal for deenergizing the receiver for a predetermined period of time subsequent to the end of said selected time slot.

37. A method for selectively receiving paging signals comprising:

assigning a first predetermined code to each of a first plurality of paging receivers of a first paging system;

assigning a second predetermined code differing from said first code to each of a second plurality of paging receivers of a second paging system;

assigning paging addresses to the first and second plurality of paging receivers, the paging addresses of each of the first plurality of paging receivers differing from each other and the paging addresses of each of the second plurality of paging receivers differing from each other;

receiving transmitted paging signals including one of the first and second predetermined codes and a paging address at each of the first and second plurality of receivers;

evaluating the received predetermined code against the assigned predetermined code at each of the first and second plurality of receivers; and, evaluating received paging address with respect to the assigned paging address in response to a successful evaluation of the received predetermined code.

38. The method of claim 37 wherein the first and second paging systems serve coextensive paging areas.

39. A radio receiver for a paging system wherein a paging signal including a digital address portion and a digital synchronizing portion is transmitted at a predetermined bit rate throughout a paging area, the receiver comprising:

means for receiving the paging signal;

means for generating a clock signal synchronized in phase and bit rate with the received paging signal;

means for locally generating a plurality of digital address signals each unique to the radio receiver;

means responsive to said clock signal for detecting differences in binary signal levels between each bit position of each of said generated digital address signals and each corresponding bit position of the address portion of the received paging signal; and, means for counting the number of detected differences for each of said locally generated digital address signals.

40. The receiver of claim 39 wherein said difference detecting means comprises means for simultaneously comparing the signal levels between each bit of the address portion of said received digital signal and each corresponding bit of each of said locally generated address signals, and means for providing an indication of each signal level difference.

* * * * *